(12) United States Patent
Lipscomb et al.

(10) Patent No.: US 11,478,758 B2
(45) Date of Patent: Oct. 25, 2022

(54) ASSEMBLY OF CHARGE MOSAIC MEMBRANES FROM IONIC POLYMERS

(71) Applicant: The University of Toledo, Toledo, OH (US)

(72) Inventors: Glenn Lipscomb, Toledo, OH (US); Ghazaleh Vaseghi, Toledo, OH (US)

(73) Assignee: The University of Toledo, Toledo, OH (US)

(*) Notice: Subject to any disclaimer, the term of this patent is extended or adjusted under 35 U.S.C. 154(b) by 253 days.

(21) Appl. No.: 16/847,725

(22) Filed: Apr. 14, 2020

(65) Prior Publication Data

US 2020/0324250 A1   Oct. 15, 2020

Related U.S. Application Data

(60) Provisional application No. 62/834,058, filed on Apr. 15, 2019.

(51) Int. Cl.
| | | |
|---|---|---|
| *B01D 69/02* | (2006.01) | |
| *B01D 69/10* | (2006.01) | |
| *C02F 1/44* | (2006.01) | |
| *B01D 71/28* | (2006.01) | |
| *B01D 71/42* | (2006.01) | |
| *B01D 71/44* | (2006.01) | |
| *C02F 103/08* | (2006.01) | |

(52) U.S. Cl.
CPC .............. *B01D 69/02* (2013.01); *B01D 69/10* (2013.01); *B01D 71/28* (2013.01); *B01D 71/42* (2013.01); *B01D 71/44* (2013.01); *C02F 1/441* (2013.01); *B01D 2323/36* (2013.01); *B01D 2325/02* (2013.01); *B01D 2325/18* (2013.01); *C02F 2103/08* (2013.01)

(58) Field of Classification Search
CPC ........ B01D 69/02; B01D 69/10; B01D 71/28; B01D 71/42; B01D 71/44; B01D 2323/36; B01D 2325/02; B01D 2325/18; B01D 71/40; B01D 71/60; B01D 2325/08; B01D 2325/14; B01D 2325/16; B01D 2325/20; B01D 2325/42; C02F 1/441; C02F 2103/08; C02F 1/44; Y02A 20/131

See application file for complete search history.

(56) References Cited

U.S. PATENT DOCUMENTS

| | | | | |
|---|---|---|---|---|
| 5,543,045 | A * | 8/1996 | Fukutomi | B01D 69/141 427/245 |
| 9,782,727 | B2 * | 10/2017 | Dubois | B01D 69/02 |
| 2007/0261962 | A1 * | 11/2007 | Gajek | B01D 15/3885 204/660 |
| 2015/0190760 | A1 * | 7/2015 | Singh | B01D 69/02 210/500.21 |
| 2018/0036687 | A1 * | 2/2018 | Hill | C02F 1/44 |
| 2018/0193803 | A1 * | 7/2018 | Phillip | B01D 61/027 |
| 2018/0326359 | A1 * | 11/2018 | Fokema | B01D 71/62 |

\* cited by examiner

*Primary Examiner* — Krishnan S Menon
(74) *Attorney, Agent, or Firm* — MacMillan, Sobanski & Todd, LLC

(57) ABSTRACT

Charge mosaic membranes useful for desalination applications, and methods of making and using the same, are described.

16 Claims, 25 Drawing Sheets
(18 of 25 Drawing Sheet(s) Filed in Color)

| Membrane | Avg Permeate Flow (m³/day) | Membrane area (m²) | Applied Pressure (psi) | Hydraulic flux (m³day⁻¹m⁻²KPa⁻¹) |
|---|---|---|---|---|
| Standard Brackish Water RO Element (AG2540FM) | 2.7 | 2.6 | 200 | 0.00075 |
| High Rejection NF Element (DK8040F1001) | 30 | 36.2 | 600 | 0.0002 |
| 4-Layer Charge Mosaic Membrane | 0.000677 | 0.001734 | 45 | 0.0012 |

FIG. 5B – Table 1

Electron Image 1

US 11,478,758 B2

ASSEMBLY OF CHARGE MOSAIC MEMBRANES FROM IONIC POLYMERS

RELATED APPLICATIONS

This application claims priority to U.S. Provisional Application No. 62/834,058 filed under 35 U.S.C. § 111(b) on Apr. 15, 2019, the disclosure of which is incorporated herein by reference in its entirety.

STATEMENT REGARDING FEDERALLY SPONSORED RESEARCH

This invention was made with no government support. The government has no rights in this invention.

BACKGROUND

Separation processes are used to separate fluid and solid mixtures. In such processes, it is preferred to remove the minor (lower concentration) components instead of the major (higher concentration) components. This reduces energy costs. Unfortunately, most desalination processes for producing drinking water from seawater or brackish water remove the major component (water) instead of the minor component (salt). It would be advantageous to have materials and methods for desalinating water which remove the minor component.

SUMMARY

The present disclosure relates to a charge mosaic membrane permitting permeation of salts to desalinate high salinity water, such as seawater and brackish water.

Provided is a charge mosaic membrane comprising a porous support having a first surface and a second surface with a thickness therebetween, wherein the porous support comprises at least one pore extending from the first surface through the thickness to the second surface; and a charge mosaic in the pore comprising an anionic polymer and a cationic polymer; wherein the cationic polymer and the anionic polymer are substantially uniformly distributed along a width of the pore.

In certain embodiments, the charge mosaic comprises a base layer of the anionic polymer and the cationic polymer, and a first layer comprising the anionic polymer deposited on the base layer. In particular embodiments, the charge mosaic further comprises a second layer comprising the cationic polymer deposited on the first layer.

In particular embodiments, the charge mosaic further comprises a third layer comprising the anionic polymer deposited on the second layer.

In particular embodiments, the charge mosaic further comprises a fourth layer comprising the cationic polymer deposited on the third layer.

In certain embodiments, the first surface comprises pore openings of a first size and the second surfaces comprises pore openings of a second size.

In particular embodiments, the first size and the second size are different. In particular embodiments, the second size is larger than the first size.

In certain embodiments, the porous support comprises polyacrylonitride (PAN). In certain embodiments, the pores have a molecular weight cutoff of 1000 Da.

In certain embodiments, the cationic polymer is a naturally derived, food grade polymer. In certain embodiments, the anionic polymer is a naturally derived, food grade polymer.

In certain embodiments, both of the cationic polymer and the anionic polymer are naturally derived, food grade polymers.

In certain embodiments, the anionic polymer is substantially free from oligomers.

In certain embodiments, the anionic polymer is substantially free from unreacted monomers.

In certain embodiments, the cationic polymer is substantially free from oligomers.

In certain embodiments, the cationic polymer is substantially free from unreacted monomers.

In certain embodiments, the porous support comprises a plurality of pores extending from the first surface through the thickness to the second surface, and each of the plurality of pores comprises the charge mosaic.

In certain embodiments, the anionic polymer is selected from the group consisting of polyanionic sodium polystyrene sulfonate (PSS), polyacryalic acid, sodium alginate, and combinations thereof. In certain embodiments, the cationic polymer is selected from the group consisting of polycationic polyallylamine hydrochloride (PAH), epsilon polylysine, polyethylenoimine, polydiallyldimethylammonium, chitosan, and combinations thereof.

Further provided is a charge mosaic membrane comprising a porous support having a first surface and a second surface with a thickness therebetween, wherein the porous support comprises at least one pore extending from the first surface through the thickness to the second surface, wherein the pore defines a top one-third, a middle one-third, and a bottom one-third, wherein the top one-third comprises a third of the thickness extending to the first surface, the bottom one-third comprises a third of the thickness extending to the second surface, and the middle one-third comprises a third of the thickness extending between the top one-third and the bottom one-third; and a charge mosaic in the pore comprising an anionic polymer and a cationic polymer; wherein at least about 80% of the anionic polymer and the cationic polymer are distributed in the top one-third of the pore.

In certain embodiments, the porous support comprises a plurality of pores extending from the first surface through the thickness to the second surface, and each of the plurality of pores comprises the charge mosaic.

Further provided is a charge mosaic membrane comprising a porous support having a first surface and a second surface with a thickness therebetween, wherein the porous support comprises at least one pore extending from the first surface through the thickness to the second surface, wherein the pore defines a top one-third, a middle one-third, and a bottom one-third, wherein the top one-third comprises a third of the thickness extending to the first surface, the bottom one-third comprises a third of the thickness extending to the second surface, and the middle one-third comprises a third of the thickness extending between the top one-third and the bottom one-third; and a charge mosaic in the pore comprising an anionic polymer and a cationic polymer; wherein the charge mosaic forms a substantially uniform layer in the top one-third of the pore.

In certain embodiments, the porous support comprises a plurality of pores extending from the first surface through the thickness to the second surface, and each of the plurality of pores comprises the charge mosaic.

Further provided is a charge mosaic membrane comprising a porous support having a first surface and a second surface with a thickness therebetween, wherein the porous support comprises at least one pore extending from the first surface through the thickness to the second surface, wherein the pore defines a top one-third, a middle one-third, and a bottom one-third, wherein the top one-third comprises a third of the thickness extending to the first surface, the bottom one-third comprises a third of the thickness extending to the second surface, and the middle one-third comprises a third of the thickness extending between the top one-third and the bottom one-third; and a charge mosaic in the pore comprising an anionic polymer and a cationic polymer; wherein the bottom one-third and the middle one-third of the pore are substantially free of the anionic polymer and the cationic polymer.

Further provided is a method of making a charge mosaic membrane, the method comprising depositing an anionic polymer into the pores of a porous support from a first surface of the porous support, wherein the pores extend from the first surface to a second surface of the porous support; depositing a cationic polymer into the pores from the first surface to form a base layer with the anionic polymer; and depositing a first layer comprising the anionic polymer into the pores from the first surface to form a 1-layer charge mosaic membrane.

In certain embodiments, the method further comprises depositing a second layer comprising the cationic polymer into the pores from the first surface to form a 2-layer charge mosaic membrane.

In particular embodiments, the method further comprises depositing a third layer comprising the anionic polymer into the pores from the first surface to form a 3-layer charge mosaic membrane.

In particular embodiments, the method further comprises depositing a fourth layer comprising the cationic polymer into the pores from the first surface to form a 4-layer charge mosaic membrane.

In certain embodiments, at least one of the anionic polymer and the cationic polymer is filtered prior to being deposited into the pores.

In certain embodiments, at least one of the anionic polymer and the cationic polymer is crosslinked prior to being deposited into the pores.

In certain embodiments, the method further comprises washing the first surface with deionized water between depositing steps, or after forming the charge mosaic membrane, to remove free polymers from the first surface.

In certain embodiments, the anionic polymer comprises a salt.

In certain embodiments, depositing the anionic polymer comprises contacting the first surface with the anionic polymer without applied pressure for a first period of time. In particular embodiments, the first period of time is about two minutes.

In particular embodiments, the membrane is left without pressure for a second period of time for the anionic polymer to diffuse.

In particular embodiments, the second period of time is about one hour. In particular embodiments, the first surface is washed with deionized water after the second period of time.

In particular embodiments, depositing the cationic polymer comprises contacting the first surface with the cationic polymer under applied pressure for a third period of time. In particular embodiments, the applied pressure is under 45 psi.

In particular embodiments, the third period of time is about one minute.

In particular embodiments, the method further comprises waiting for a fourth period of time of about 15-20 minutes to allow for diffusion of polymers after the third period of time.

In particular embodiments, the first surface is washed with deionized water after the fourth period of time.

In particular embodiments, depositing the first layer comprises contacting the first surface with the anionic polymer without applied pressure for a fifth period of time.

In particular embodiments, the fifth period of time is about 2 minutes.

In particular embodiments, the method further comprises waiting for a sixth period of time or up to about an hour to allow for diffusion of the polymers.

In particular embodiments, the first surface is washed with deionized water after the sixth period of time.

In certain embodiments, depositing the second layer comprises contacting the first surface with the cationic polymer under applied pressure for a seventh period of time.

In particular embodiments, the applied pressure is under 45 psi.

In particular embodiments, the seventh period of time is about one minute.

In particular embodiments, the method further comprises waiting an eighth period of time of about 15-20 minutes to allow for diffusion of the polymers.

In particular embodiments, the first surface is washed with deionized water after the eighth period of time.

In certain embodiments, depositing the third layer comprises contacting the first surface with the anionic polymer without applied pressure for a ninth period of time.

In particular embodiments, the method further comprises waiting for a tenth period of time of up to about an hour to allow for diffusion of the polymers.

In particular embodiments, the first surface is washed with deionized water after the tenth period of time.

In certain embodiments, depositing the fourth layer comprises contacting the first surface with the cationic polymer under applied pressure for an eleventh period of time.

In particular embodiments, the method further comprises waiting for a twelfth period of time of about 15-20 minutes to allow for diffusion of the polymers.

In particular embodiments, the first surface is washed with deionized water after the twelfth period of time.

In certain embodiments, the anionic polymer is selected from the group consisting of polyanionic sodium polystyrene sulfonate (PSS), polyacryalic acid, sodium alginate, and combinations thereof. In certain embodiments, the cationic polymer is selected from the group consisting of polycationic polyallylamine hydrochloride (PAH), epsilon polylysine, polyethylenoimine, polydiallyldimethylammonium, chitosan, and combinations thereof.

Further provided is a method of desalinating an aqueous solution, the method comprising passing an aqueous feed solution containing salt through a charge mosaic membrane as described herein to permeate salt.

In certain embodiments, the method further comprises adding a salt push agent to the feed solution. In particular embodiments, the salt push agent contains either $Na^+$ or $Cl^-$ ions.

In particular embodiments, the salt push agent comprises a naturally derived, food grade polymer.

In certain embodiments, the permeate is enriched in salt.

In certain embodiments, the charge mosaic membrane includes multiple layers to minimize defects and increase selectivity.

In certain embodiments, the method further comprises crosslinking the charge mosaic to tighten the charge mosaic and increase selectivity while also increasing stability so as to enhance salt permeation.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 3A shows a charge mosaic membrane having a base layer. FIG. 3B shows a 1-layer membrane. FIG. 3C shows a 2-layer membrane. FIG. 3D shows a 3-layer membrane. FIG. 3E shows a 4-layer membrane.

FIGS. 5A-5B: Graph showing the water permeability after mixture feed tests as a function of hydraulic flux for each of a 1-layer membrane, 2-layer membrane, 3-layer membrane, 4-layer membrane, 5-layer membrane, and 6-layer membrane (FIG. 5A), and Table 1, showing that the 4-layer charge mosaic membrane had a hydraulic flux comparable to a commercially available reverse osmosis (RO) membrane (FIG. 5B). Each of the charge mosaic membranes were prepared with a one-sided production method.

FIGS. 9A-9B show the results of salt enrichment and polymer rejection using a 2-layer membrane and a 3-layer membrane each prepared from a two-sided method, respectively. FIG. 9C shows the enrichment percent from the 4-layer membrane. FIG. 9D shows the effect of formation layers from these membranes. FIG. 9E shows the stability of these membranes as a function of time. Notably, these measurements were taken while monomers were present in the permeate solution, which affects the calculated salt enrichment.

FIG. 10A shows a cross-sectional SEM images of the membrane, and FIG. 10B shows EDS mapping of the membrane.

FIG. 11A shows a cross-sectional SEM images of the membrane, and FIG. 11B shows EDS mapping of the membrane.

DETAILED DESCRIPTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Figure 1:
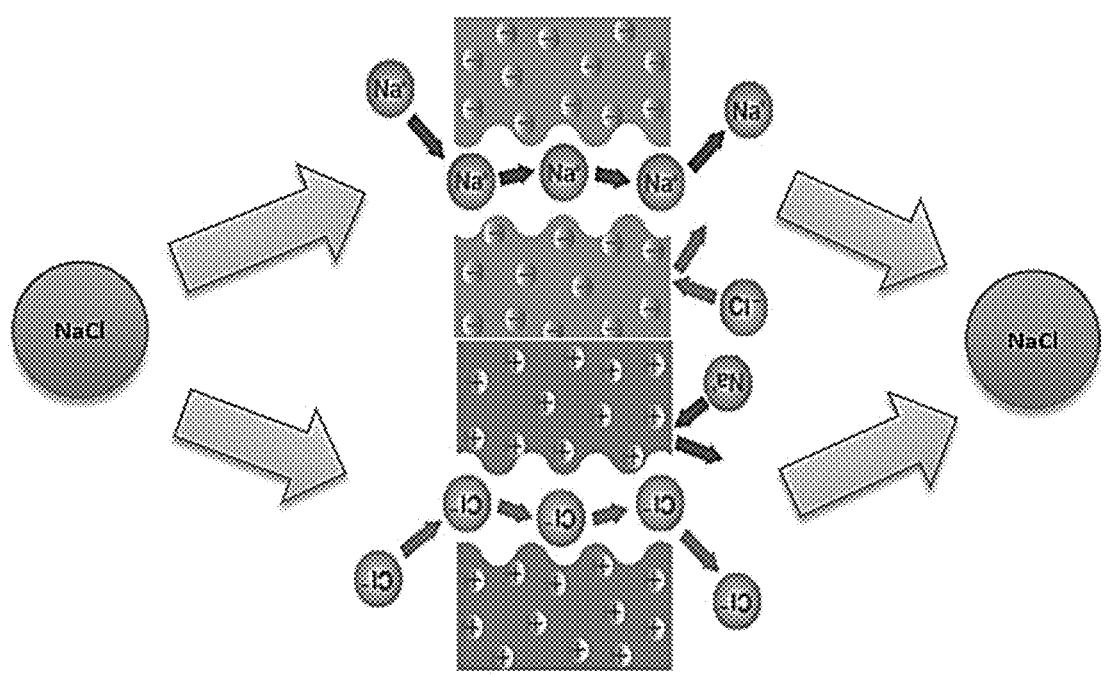
FIG. 1: Illustration of an aqueous salt solution passing through a typical charge mosaic membrane.
Figure 2:
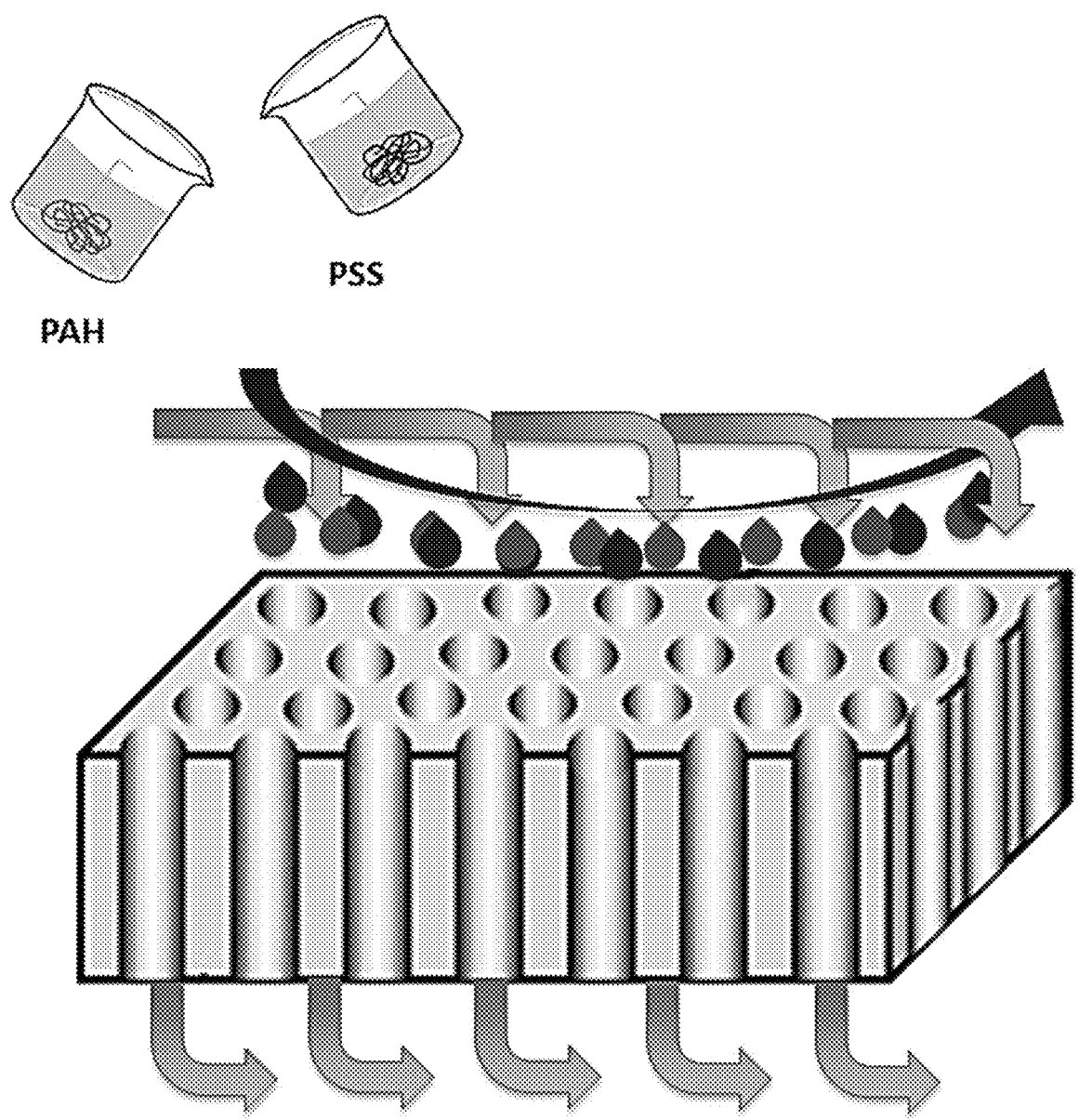
FIG. 2: Illustration of a charge mosaic membrane in accordance with the present disclosure.

In general, a charge mosaic membrane is a parallel array of ion-exchange elements that is permeable to salts, and may be used in destination of water or other salt removal processes. A charge mosaic membrane may be composed of interdigitated, continuous cation and anion exchange domains. A solution of high salinity may be forced through the membrane. This is illustrated in FIG. 1. The salt is enriched with permeation of water through the membrane. The use of charge mosaic membranes is advantageous over high pressure processes for desalination. Such membranes offer the ability to permeate salt ions from a low concentration solution to a higher concentration by convective flow of salt with water through adjacent cation and anion exchange materials, each providing a continuous pathway from feed to permeate. Anions and cations can flow in parallel through their respective pathways without violating macroscopic electroneutrality. The idea of transporting ions through charge mosaic membranes was first proposed in 1932. Since then, the major structures used to fabricate a charge mosaic membrane were embedded ion exchange resins, block copolymers, polymer blends, and stacked ion-exchange membranes. However, known charge mosaic membranes have problems such as low enrichment, a lack of sufficient mechanical strength, and low flux.

Provided herein are charge mosaic membranes created by assembly of counterion polyelectrolytes that are usable for separation of salt from aqueous solutions. A process for producing a charge mosaic membrane based on self-assembly of ionic polymers within the pores of a support membrane is also described herein. The resulting charge mosaic membranes have advantageous properties and are useful for desalination processes.

The charge mosaic membranes of the present disclosure may be prepared by depositing polyelectrolytes through diffusion-penetration steps to build charged channels inside the pores of a support membrane. To create the parallel channels for ion transport, anionic and cationic polymers are introduced into the pores in various ways. The ionic polymers may first be dispersed into water. The solutions may be brought into contact with the surfaces of the membrane so the suspended polymer may either diffuse into the pores or be forced into the pores by convective flow of the solution. The support membranes commonly have an asymmetric structure so the two membrane surfaces possess different pore size and porosity. Therefore, the formation process and membrane thereby produced will depend on which side of the support that the solutions contact. As demonstrated herein, more effective charge mosaic membranes may be prepared by contacting only one side of the support with the polymer solutions (i.e., using a "one-sided" method to prepare the membranes) as opposed to depositing the polymers from both sides of the method (i.e., a "two-sided" method).

Two counterion polyelectrolytes may be deposited inside the pores of a porous support using a diffusion-penetration method, creating a self-assembled charge mosaic structure that can selectively permeate salt. The two counterion polyelectrolytes, an anionic polymer and a cationic polymer, may be introduced to the surface of the porous support to create the crosslinked network inside the pores as a charge mosaic structure. Non-limiting examples of suitable anionic polymers include polyanionic sodium polystyrene sulfonate (PSS), polyacryalic acid, sodium alginate, and combinations thereof. Non-limiting examples of suitable cationic polymers include polycationic polyallyamine hydrochloride (PAH), epsilon, polylysine, polyethylenoimine, polydiallyldimethylammonium, chitosan, and combinations thereof. Advantageously, either or both of the anionic polymer and the cationic polymer may be naturally derived, food grade polymers, thereby improving sustainability and minimizing environmental impacts. Non-limiting examples of suitable food grade polymers include polylysine and sodium alginate. The ionic polymers may be introduced by diffusion or convection into the porous support where ionic crosslinking yields the desired membrane structure.

Referring now to FIGS. 3A-3E, non-limiting example charge mosaic membranes 10 in accordance with the present disclosure are depicted. In general, a charge mosaic membrane 10 may include a porous support 12, and a charge mosaic composed of an anionic polymer 14 and a cationic polymer 16 within the pores 18 of the porous support 12. The porous support 12 may be a flat sheet membrane that has a first surface 20 and a second surface 22, and a thickness 24 therebetween, with the pores 18 extending from the first surface 20 through the thickness 24 to the second surface 22. Both of the first surface 20 and the second surface 22 may have pore openings 26, 28 therein, with pores 18 extending from the respective surface 20, 22 into the thickness 24. The first surface 20 may have more uniform pore openings 26 than the second surface 22, and may have smaller pore openings 26 than the second surface 22. In other words, the size of the pore openings 26 in the first surface 20 may be different, and may be smaller, than the size of the pore openings 28 in the second surface 22. Moreover, the pore openings 28 in the second surface 22 may be less uniform than the pore openings 26 in the first surface 20. However, this is not strictly necessary.

In some embodiments, the porous support 12 is asymmetric, possessing two surfaces 20, 22 with different properties. The pore openings 26 that determine membrane rejection (i.e., the smallest pore openings) are located on one surface 20 of the support 12 while the other surface 22 may contain larger pore openings 28 as part of a structure that provides mechanical support for the discriminating pores 18. Thus, the first surface 20 may also be referred to as the active surface, while the second surface 22 may also be referred to as the support layer. The discriminating side 20 may possesses a "shiny" appearance relative to the support side 22. In use, the feed solution is generally contacted with the active side surface 20 to minimize concentration polarization.

The porous support 12 may be, for example, an ultrafiltration membrane made from dpolyacrylyonitrile (PAN). The porous support 12 may have a molecular weight cutoff (MWCO) of 1000 Da. The pores 18 may have a size of about 0.1 µm and a molecular weight cutoff of about 1000 Da. However, other sizes and materials are possible and encompassed within the present disclosure. For example, if the porous support 12 has larger pores, it may be important to form additional layers of the charge mosaic within the porous support 12.

In one non-limiting example, a charge mosaic membrane 10 may be fabricated from adding selected ionic polyelectrolytes directly to the pores 18 of an ultrafiltration support 12 with a molecular weight cutoff (MWCO) of 1000 Da. In one non-limiting example, the ionic polyeolectrolytes are polyanionic sodium polystyrene sulfonate (PSS) as the anionic polymer 14 and polycationic polyallyamine hydrochloride (PAH) as the cationic polymer 16. The polymeric solutions 14, 16 may contact the support 12 by flowing the polymer solutions 14, 16 across the first surface 20 to permit polymer diffusion into the pores 18, or permeating a portion of the polymer solution 14, 16 across the support 12 by applying pressure. The contact time can be varied to control membrane thickness and structure. Upon permeating into the pores 18, the charge mosaic membrane 10 forms by ionic crosslinking. The crosslinked structure contains cationic and anionic sites from the ionic polymers 14, 16 that do not participate in crosslinking. These sites form the continuous channels that are important for salt transport. The degree of crosslinking may be controlled by the addition of a low molecular weight salt (e.g., sodium chloride) to each of the polyelectrolyte solutions.

Depending on the desired use, the purity of the ionic polymers 14, 16 used to form the charge mosaic membranes may be important. In order to remove the monomers and oligomers from the ionic polymers 14, 16, polymers such as PSS may be filtered, and polymers such as PAH may be crosslinked to branch the unreacted monomers. Without wishing to be bound by theory, it is believed from NMR results that the presence of monomers and oligomers in the ionic channels makes them less stable under convective flow of the salty feed solution, and causes the release of them in the permeate flow. Thus, in some embodiments, one or more of the ionic polymers 14, 16 used to create the charge mosaic membrane 10 is filtered, crosslinked, or both filtered and crosslinked prior to being used to form the charge mosaic membrane 10.

Figure 3A:
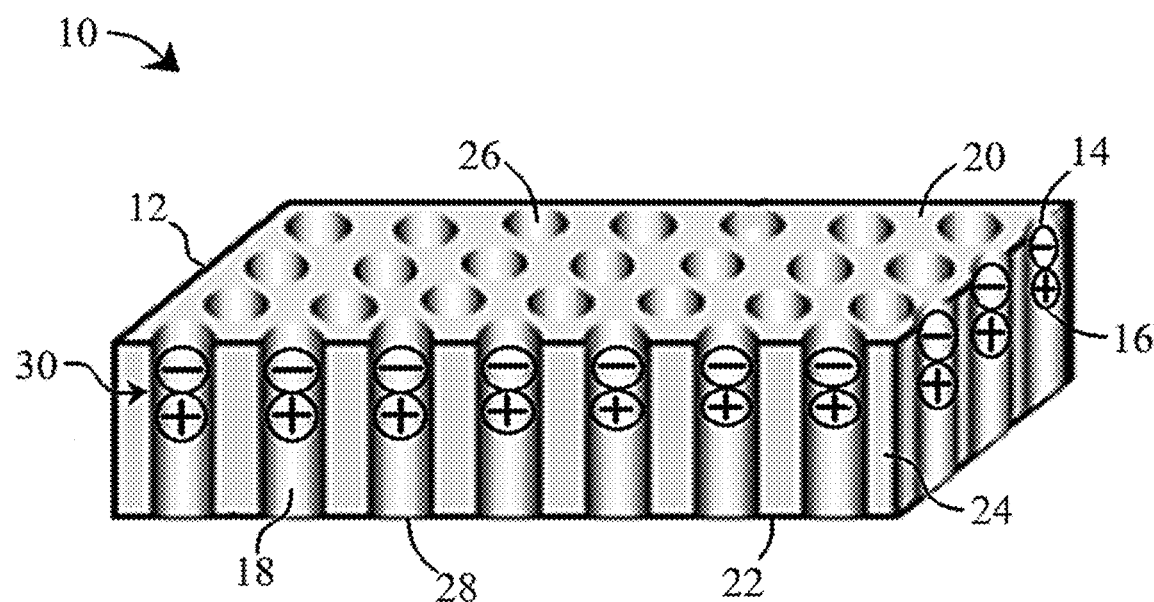
FIGS. 3A-3E: Illustrations of charge mosaic membranes.
Figure 3B:
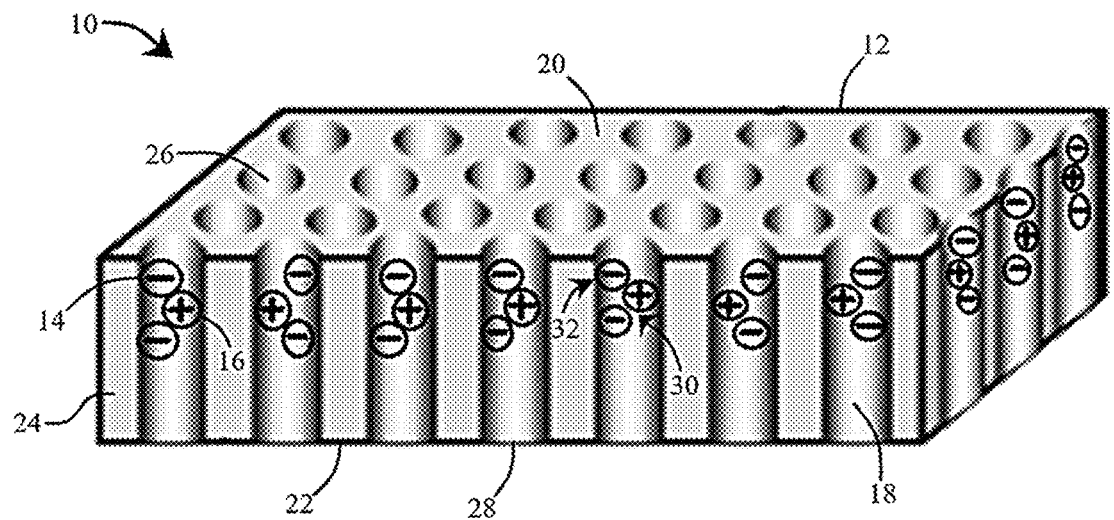
Figure 3C:
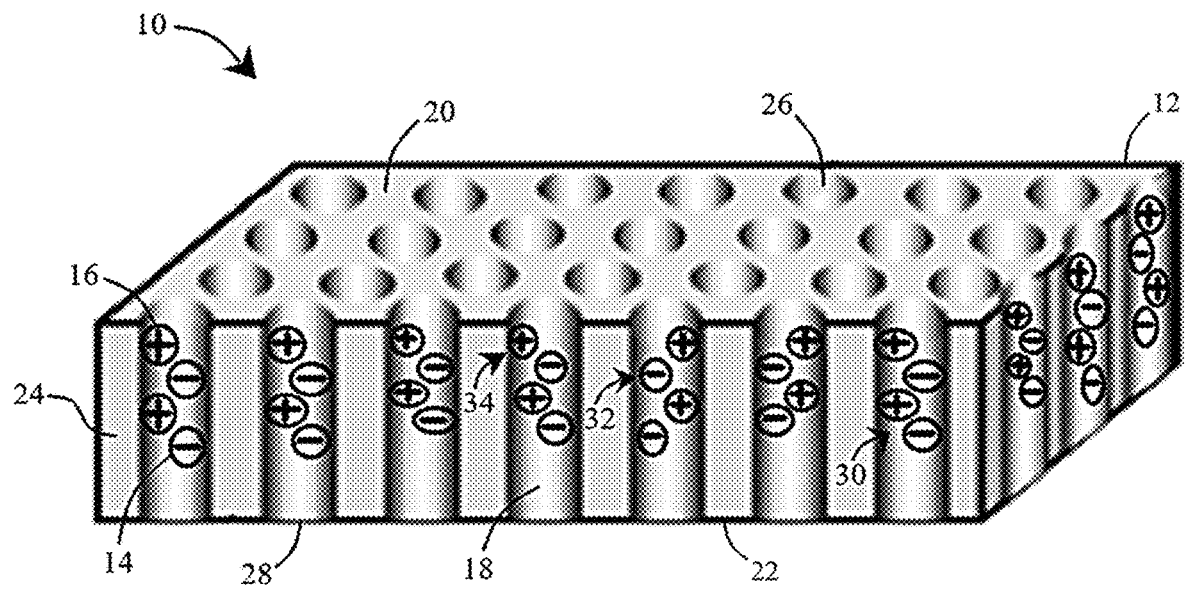
Figure 3D:
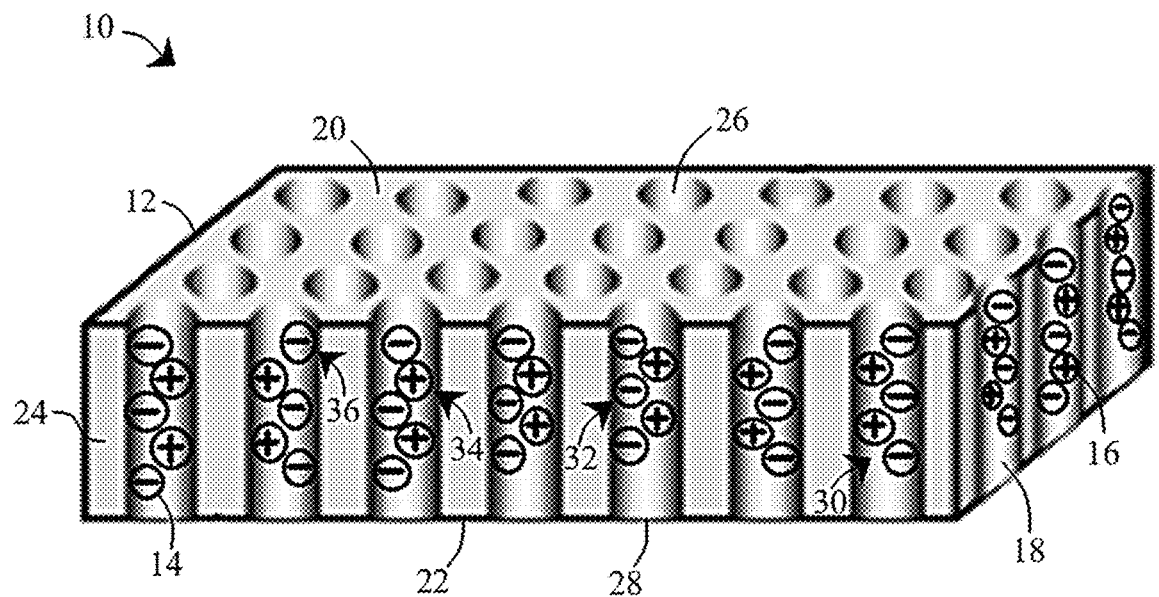
Figure 3E:
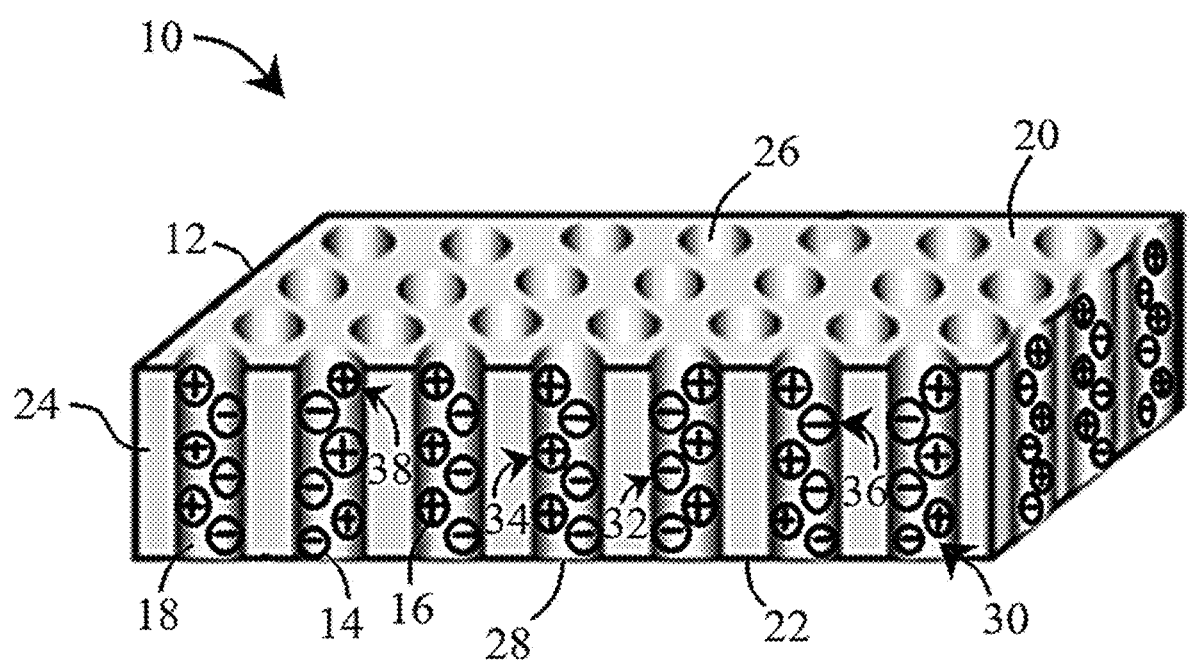

Referring still to FIGS. 3A-3E, the first deposition of anionic polymer 14 and cationic polymer 16 (negative and positive polyelectrolytes) within the pores 18 of the porous support 12 forms the "base layer" 30. A charge mosaic membrane 10 having only a base layer 30 is depicted in FIG. 3A. After creating the base layer 30, the first surface 20 may be contacted with the anionic polyelectrolyte solution to fill potential defects and stabilize the structure, forming what may be referred to as a first layer 32. The charge mosaic membrane 10 thus produced is referred to as a "1-layer" membrane. A 1-layer membrane is depicted in FIG. 3B. Subsequent passage of the cationic polymer 16 through a 1-layer membrane produces a second layer 34, and the charge mosaic membrane 10 thereby produced is a "2-layer" membrane. A 2-layer membrane is depicted in FIG. 3C. Further introduction of polyelectrolyte of alternating charge produces an "n layer" where n refers to the total number of layers. For example, a 3-layer membrane having a third layer 36 is depicted in FIG. 3D, and a 4-layer membrane having a fourth layer 38 is depicted in FIG. 3E. The total number of layers n is not particularly limited. The surface of the membrane may be washed with deionized water between each deposition and at the end of the process when the CM structure is complete to remove free polymers from the membrane surface and pores.

Figure 4:
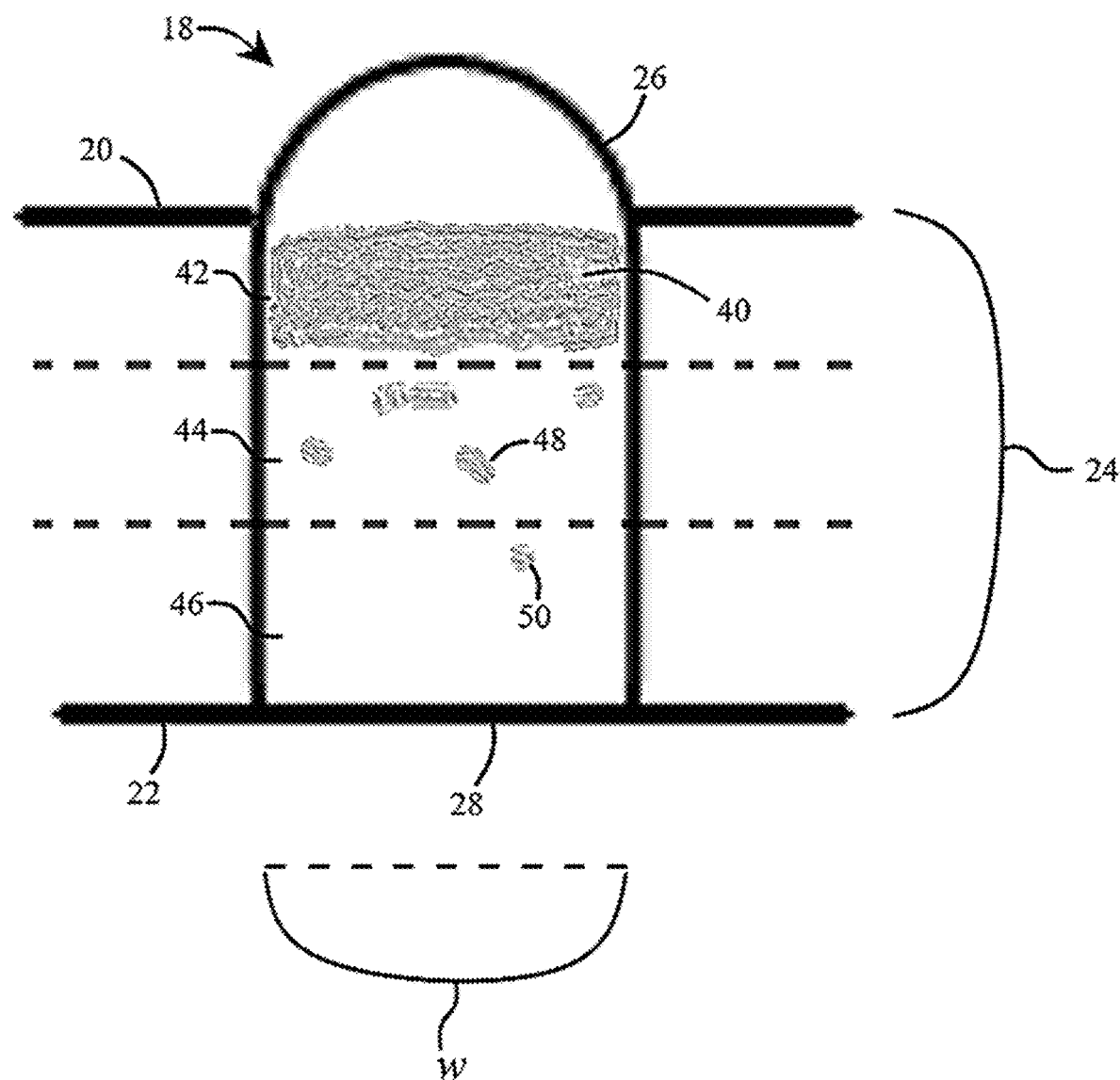
FIG. 4: Cross-sectional illustration of a pore of a charge mosaic membrane having polymers dispersed therein.

It is understood that the illustrations in FIGS. 3A-3E do not depict the actual distribution of the polymers inside the pores. As illustrated in FIG. 4, a pore 18 may have a cross section in which about 80% of the polymers 14, 16 are dispersed in about one-third of the pore thickness 24. In particular, about 80% of the polymers may be dispersed in the top one-third 42 of the pore thickness 24, closest to the pore opening 26 through which the polymers 14, 16 were deposited into the pore 18. A small amount of the polymers 14, 16 may be dispersed in the middle one-third 44, and an even smaller amount of the polymers may be dispersed in the bottom one-third 46. The polymers 14, 16 may form a substantially uniform layer 40, and have a substantially uniform distribution, along a width w of the pore 18 in the top one-third 42. The polymers 14, 16 may form a sporadic distribution 48 in the middle one-third 44, and a scarce distribution 50 in the bottom one-third 46. The bottom one-third 46 and the middle one-third 44 may be substantially free of the polymers 14, 16. As shown in the examples herein, this distribution of the polymers is made possible by a one-sided method of forming the charge mosaic membrane 10.

To create the charge mosaic membranes 10 with a one-sided method, the polymers 14, 16 are added from the top side of the porous support 12, contacting the first surface 20, which is the side having the smaller pore openings 26, instead of from both sides of the porous support 12. This single-sided formation technique not only creates a more uniform distribution of the polymers 14, 16 (as seen in FIG. 4 and further demonstrated in the examples herein), but also avoids the issues that result from a two-sided formation method. Without wishing to be bound by theory, it is believed that doing this prevents the polymers 14, 16 from escaping from the membrane structure into the permeate. This process for forming a charge mosaic membrane 10 using polyelectrolytes is readily scalable and yields membranes with excellent permeability and stability.

Furthermore, again without wishing to be bound by theory, it is believed that not giving enough time for diffusion of polymers 14, 16 or insufficient pressure when sending the polymers 14, 16 inside the pores 18 can create positive and negative layers on the surface 20 of the porous support 12 or the openings 26, 28 of the pores 18 instead of inside the pores 18, thereby blocking the pores 18 and creating a membrane similar to reverse osmosis that will reject the salts instead of enriching them. Therefore, any or all of the contacting steps whereby the ionic polymers 14, 16 are contacted with the porous support 12 may be applied for a period of time ranging from about 30 seconds to about 2 hours, or from about 1 minute to about 10 minutes, and/or under an applied pressure of up to about 45 psi. Also, each time after deposition of either of the polymers 14, 16 there may be a waiting period ranging from about 5 minutes to about 60 minutes prior to washing the surface 20 with deionized water. The waiting period may allow for diffusion of polymers 14, 16 left on the surface 20. In some embodiments, after each deposition of the anionic polymer 14, there is a waiting period of up to about an hour. In some embodiments, after each deposition of the cationic polymer 16, there is a waiting period of about 15-20 minutes. However, other amounts of time for any of the waiting periods are entirely possible and nonetheless encompassed within the scope of the present disclosure.

In some embodiments, the charge mosaic membranes described herein possess excellent stability based on measurements of a stable long-term hydraulic flux. The charge mosaic membranes may be used for permeating salt from aqueous salt solutions. An ionic polymer also may be added to the aqueous salt solution to enhance the preferential permeation of the salt. The added polymer component may be the same as one of the components used to form the membrane or may be different. The salt enrichment can be enhanced dramatically with the addition of the ionic polymer to the feed.

Salt transport through the membranes may be determined using saline solutions containing a low molecular weight salt and a high molecular weight anionic or cationic polyelectrolyte that is rejected by the membrane based on size. The polyelectrolyte may be selected such that the counter ion (i.e., the ion that balances the charge on the polymer backbone) is the same as the cation or anion of the low molecular weight salt. Addition of the polyelectrolyte can increase the total concentration of the counter ion dramatically above that due to the low molecular weight salt alone. This increased concentration can enhance permeation of the low molecular weight salt due to Gibbs-Donnan equilibrium at the interface between the membrane and the feed solution. However, this is not strictly necessary.

For example, the addition of a high molecular weight, impermeable anionic polyelectrolyte with Na as the counterion to a NaCl solution can increase the Na concentration and enhance the driving force for $Na^+$ transport. A salt push agent containing one of the salt ions (either $Na^+$ or $Cl^-$) can be added to the saline feed solution to increase the driving force for one of the ions across the membrane and is rejected by the membrane. The salt push agent may be added up to its solubility limit Performance is characterized by the ratio of the counter ion concentration from the push agent to that from the salt. Since the polyelectrolyte is rejected by the membrane, an enhanced rate of $Na^+$ transport will lead to an enhanced rate of $Cl^-$ transport, as required by electroneutrality, and can lead to NaCl enrichment in the permeate.

The present disclosure provides a charge mosaic membrane that selectively removes salt from water in desalination processes. Further provided is a process to create these charge mosaic membranes based on self-assembly of polyelectrolytes. The charge mosaic membranes offer great ability to enhance the performance of desalination processes. One significant application is desalination of brackish water, but other applications exist, especially in the pharmaceutical and chemical industries.

The charge mosaic membranes described herein are useful in desalting applications including, but not limited to, desalination of brackish water and removal of salt from chemical process streams. A module may be made from a plurality of the charge mosaic membranes for large scale desalination applications. Further, an array of modules each composed of a plurality of charge mosaic membranes may be implemented for large scale desalination applications. Advantageously, the charge mosaic membranes described herein involve an easy formation process and a short formation time, and have high enrichment and hydraulic stability.

EXAMPLES

Example I—Charge Mosaic Membranes Produced from a One-Sided Method

As shown in this example, the charge mosaic membranes possess a charge mosaic structure that allows selective transport of salt relative to water and produce a permeate with a higher salt concentration than the feed. This enrichment in the low molecular weight salt was accompanied by rejection of the polyelectrolyte to the limits of detection. Moreover, the hydraulic permeability of deionized water was stable over the longest runs conducted (2-3 hrs) with no detectable loss of polymer.

Membrane Thickness Example 1 (3-Layer)

A charge mosaic membrane was created using a diffusion-penetration technique as follows: first, the membrane surface was contacted with a polyanion solution with a concentration of 0.02 M PSS and 0.5 M NaCl without applied pressure for two minutes (Diffusion Step). The pressure was removed and the membrane was left for one hour to allow diffusion of the polymer through the porous structure of the support. After one hour, the membrane surface was washed with DI water to remove PSS from the feed channel. Washing was stopped once the conductivity of the outlet stream decreased to the DI water conductivity. Next, the ultrafiltration support was contacted with the polycation solution with a concentration of 0.02 M PAH and 1.0 M NaCl under 45 psi applied pressure for one minute (Penetration Step). The membrane was washed with DI water after one hour to set the base layer of the charge mosaic (CM) membrane.

The polyanion solution was contacted with the membrane under no applied pressure for 2 minutes to introduce the first layer. After washing the surface with DI water, the second layer was added by contacting the membrane with polycation solution under 45 psi pressure for one minute. After creating the 2-layer CM membrane, the surface was washed with DI, and the hydraulic flux of the membrane was tested by permeating DI water under 45 psi pressure. This 2-Layer CM membrane showed 28% salt enrichment when tested with a feed solution of 700 ppm NaCl and 2500 ppm PSS under 45 psi pressure.

Membrane Thickness Example 2 (4-Layer)

The 3rd and 4th layers were added to a 2-layer membrane by repeating the polyanion diffusion and polycation-penetration steps, respectively. A 4-layer CM membrane prepared by this technique gave 55% salt enrichment when tested with a feed solution of 560 ppm NaCl and 7000 ppm PSS under 45 psi pressure.

Polymer Example (PSS/PAH and PSS in Feed)

To test the Gibbs-Donnan effect on the CM membranes, a feed of 300 ppm NaCl solution was permeated under an applied pressure of 45 psi through a 4-layer CM membrane. The permeate showed −2% salt enrichment (i.e. 2% rejection of NaCl). Adding 7000 ppm PSS to the feed resulted in 97% salt enrichment under the same operating conditions.

Salt Concentration Example

The created CM membranes were tested with different salt concentration feeds. A 4-layer membrane tested with a feed solution of 2000 ppm NaCl and 25000 ppm PSS under 45 psi pressure gave 40% salt enrichment.

Polymer to Salt Molar Ratio Example 1 (10×)

The amount of polymer added to the saline feed was quantified by the ratio of the counterion from the polymer to the counterion from the salt. This ratio was varied from 0 to 20. A feed solution of 600 ppm NaCl and 25000 ppm PSS possesses a sodium-ion-from-polymer to sodium-ion-from-salt ratio of 10 and gave 109% salt enrichment with a 4-layer membrane.

Polymer to Salt Molar Ratio Example 2 (4×)

A feed solution of 1500 ppm NaCl and 25000 ppm PSS possesses a sodium-ion-from-polymer to sodium-ion-from-salt ratio of 4 and gave 51% salt enrichment with a 4-layer membrane.

Crosslinking Example

To improve membrane stability and performance, a 4-layer membrane was crosslinked with a 5 wt. % glutaraldehyde solution. Crosslinking can improve mechanical strength and tighten the network to increase selective transport. After contacting the membrane with the crosslinker for 23 hours, a 4-layer crosslinked membrane was tested with a feed of 400 ppm NaCl and 7000 ppm PSS concentration. Results showed 107% salt enrichment in the permeate stream.

Figure 5A:
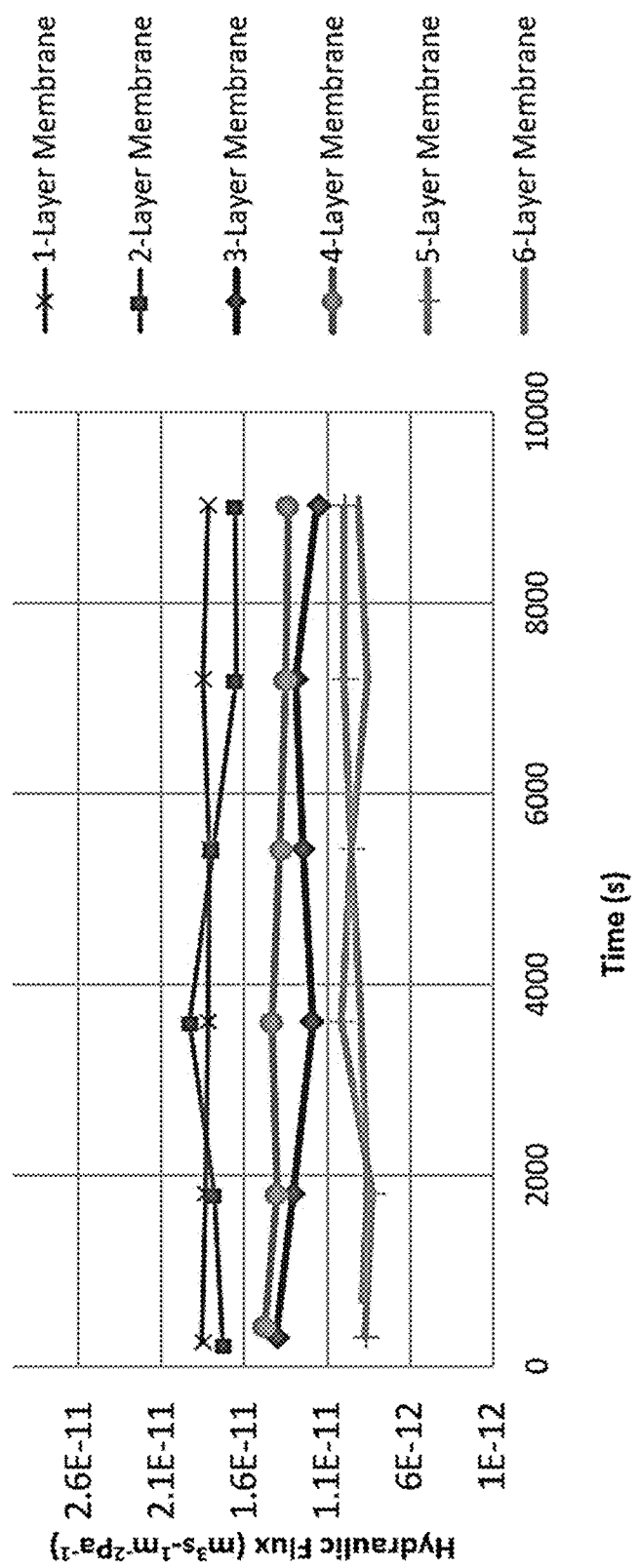

FIG. 5A shows the water permeability after mixture feed tests as a function of hydraulic flux for each of a 1-layer membrane, 2-layer membrane, 3-layer membrane, 4-layer membrane, 5-layer membrane, and 6-layer membrane prepared from a one-sided method. FIG. 5B shows Table 1, showing that the 4-layer charge mosaic membrane had a hydraulic permeability that is comparable to commercial RO membranes, showing that these charge mosaic membranes can be used in practical applications.

Example II—Membranes made from a Two-Sided Production Method

Figure 6:
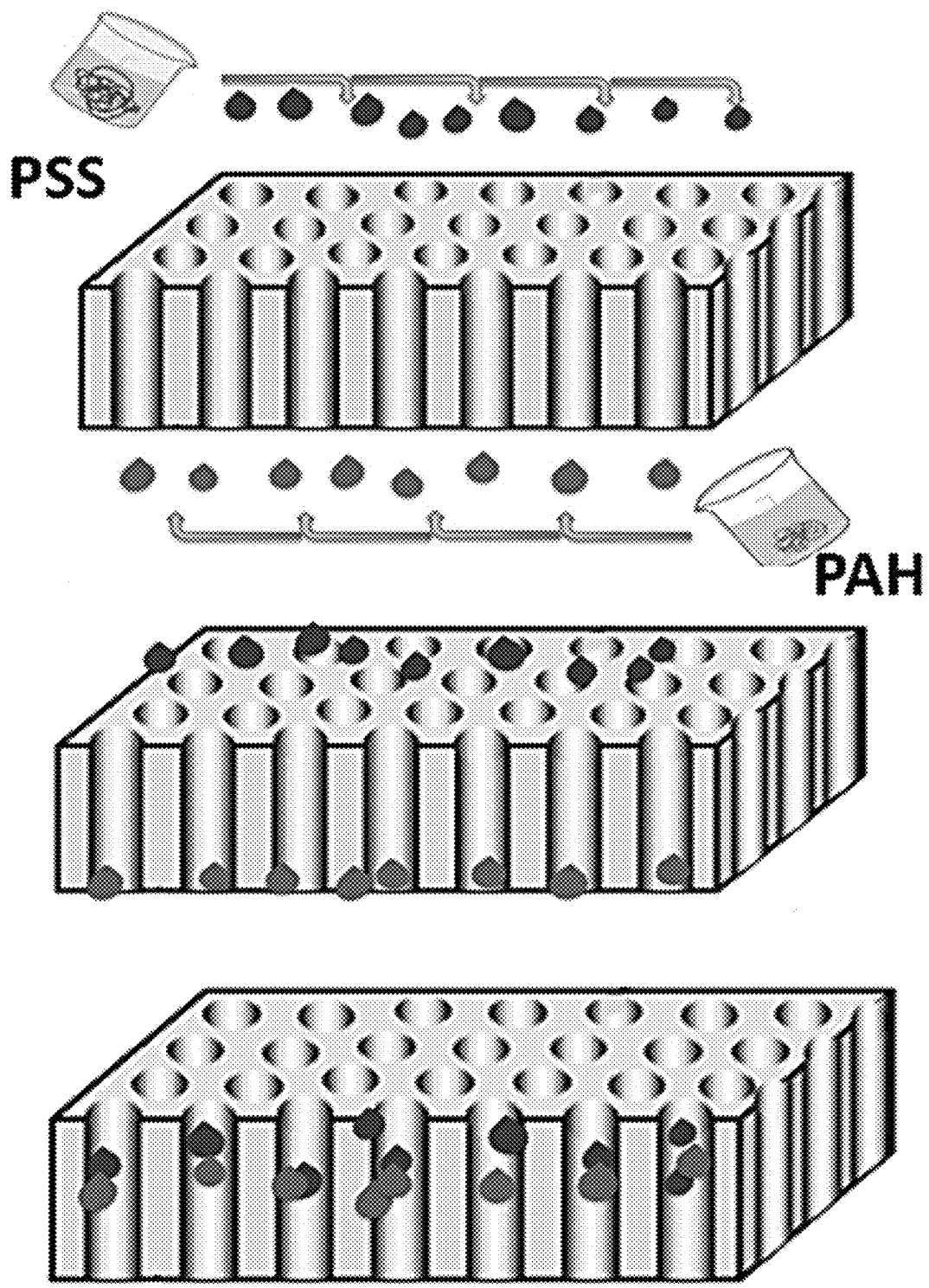
FIG. 6: Illustration of charge mosaic membranes produced from a two-sided production method.

Membranes were prepared by counter-diffusion and ionic crosslinking of polyelectrolytes inside the pores of a support membrane, creating the cationic and anionic flow channels important for a charge mosaic membrane. However, a two-sided approach was used, where the PSS was added to one side of the support and the PAH was added to the other side of the support, and depicted in FIG. 6. Counterion polymers were sent to the membrane simultaneously from two sides. This method produced a membrane having a balance of alternate charged layers above which aggregates block the pores and rejection takes place. Crosslinking produced a great enhancement of salt enrichment with these membranes, while having little effect on polymer rejection.

Figure 7A:
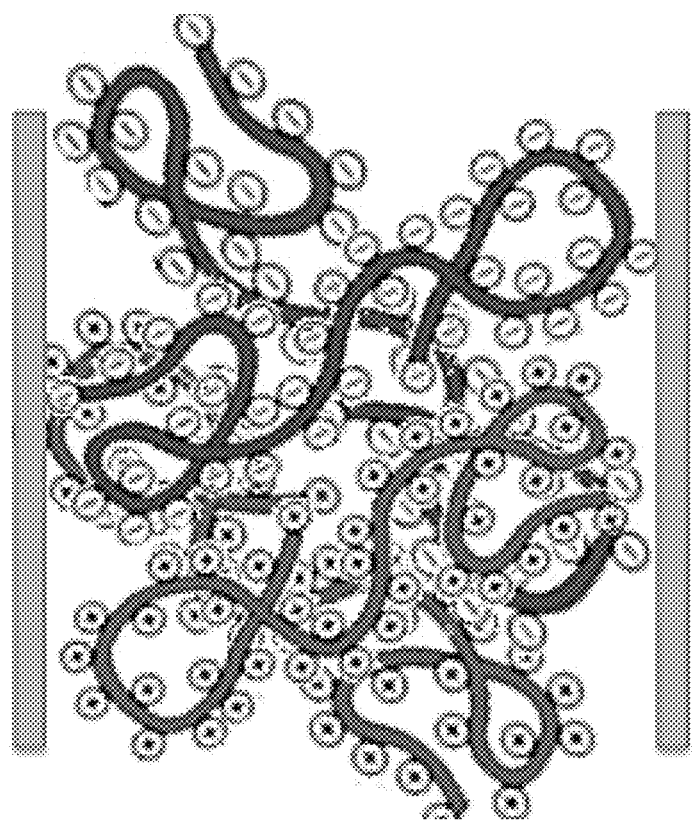
FIG. 7A: Cross sectional illustration of a pore of a charge mosaic membrane made from the two-sided method.
Figure 7B:
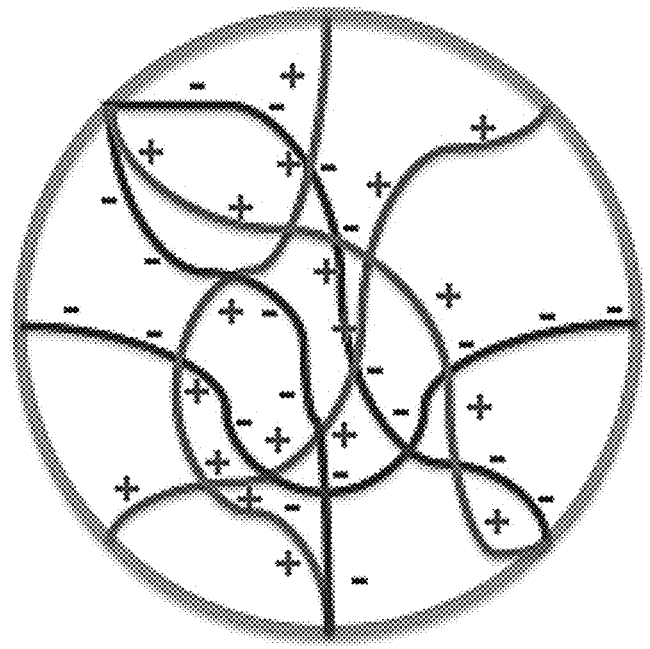
FIG. 7B: Top-down illustration of a pore of a charge mosaic membrane made from the two-sided method.
Figure 8A:
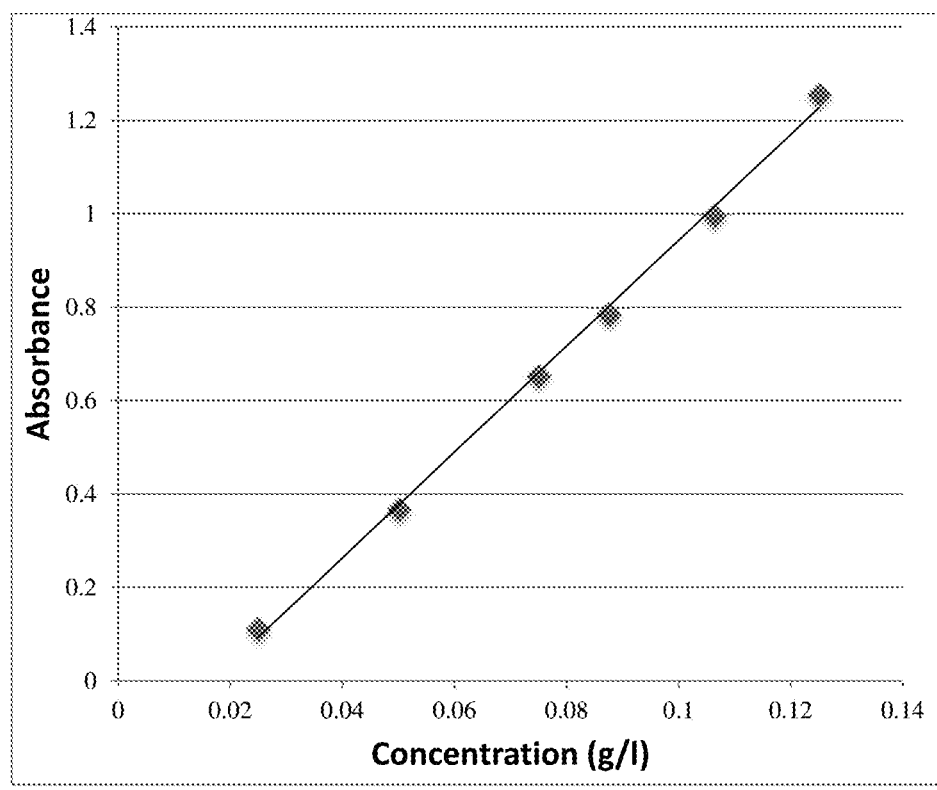
FIGS. 8A-8B: Graphs of absorbance versus concentration (FIG. 8A) and conductivity versus concentration (FIG. 8B) for membranes produced from a two-sided production method. Concentration=0.088 Abs.+0.017. Mix. conc.=0.462*salt conc.+0.462*polymer conc.+0.53. Notably, these measurements were taken with monomers present, which affect both the conductivity and the UV peaks.
Figure 8B:
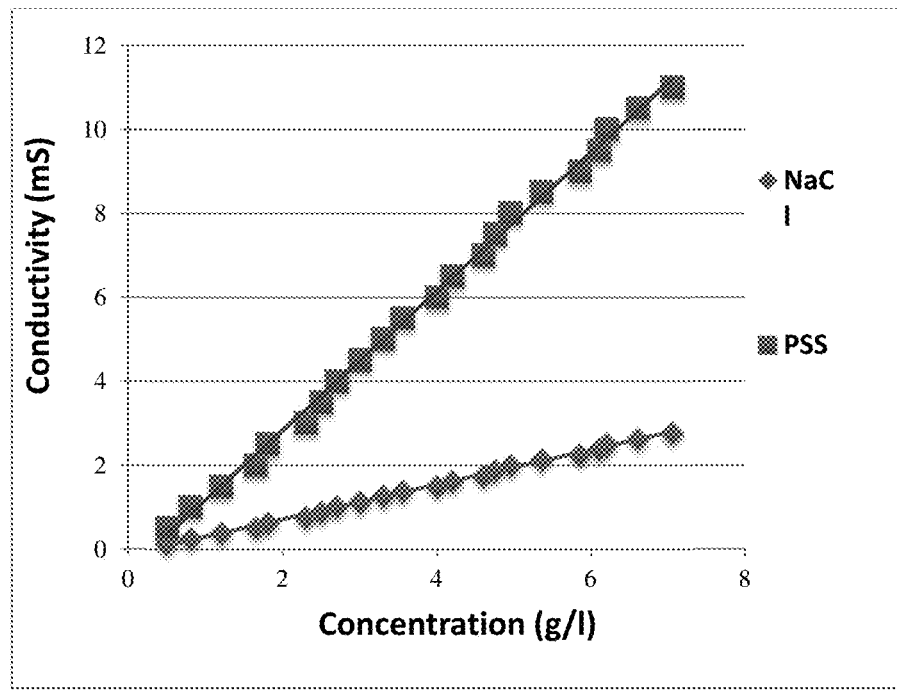

FIG. 7A shows a side-view illustration of one pore, and FIG. 7B shows a top-view illustration of one pore of the membranes produced from the two-sided method. FIG. 8A shows a graph of absorbance versus concentration, and FIG. 8B shows a graph of conductivity versus concentration. Notably, these measurements were taken with monomers present, which affect both the conductivity and the UV peaks.

Figure 9A:
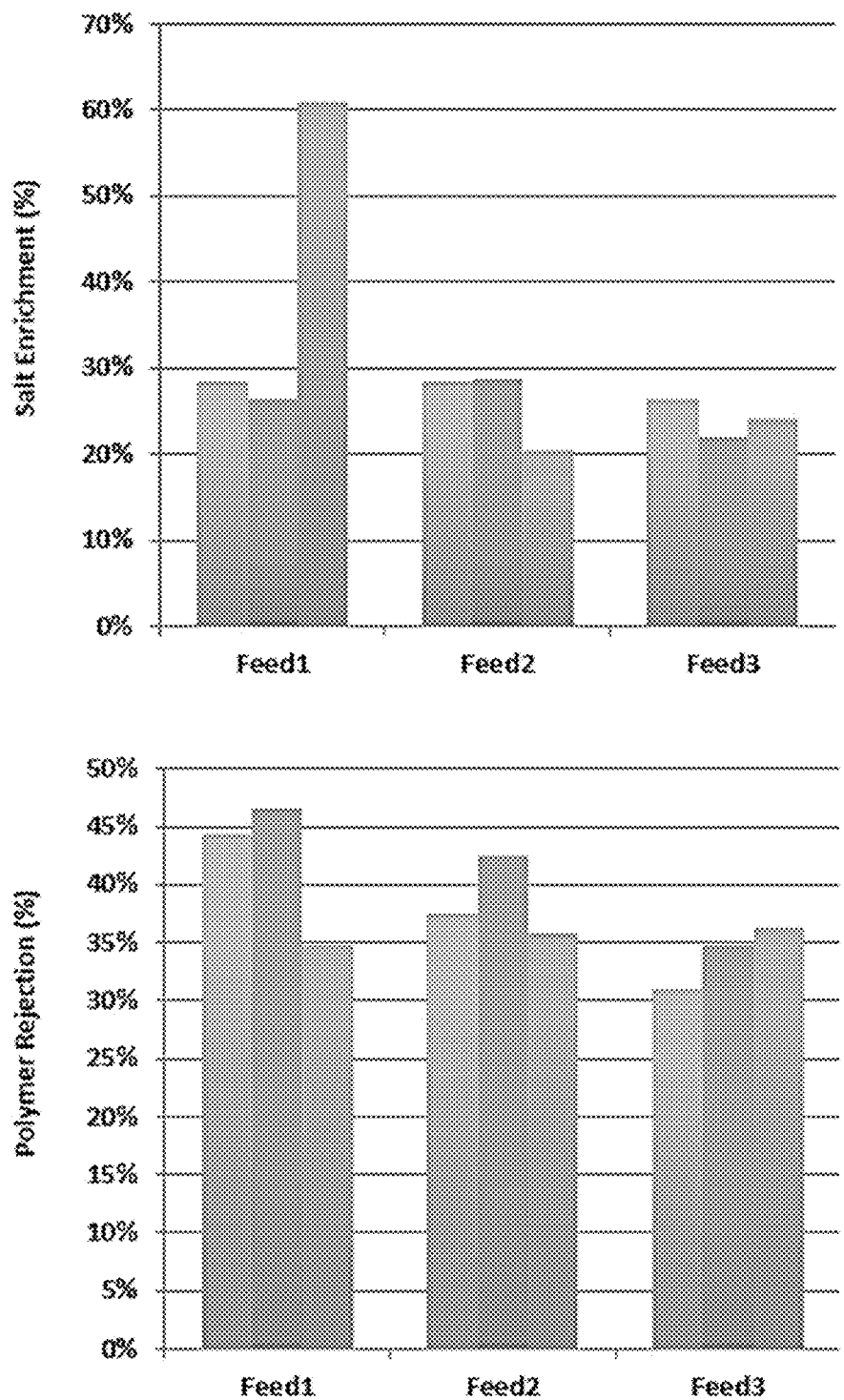
FIGS. 9A-9E.
Figure 9B:
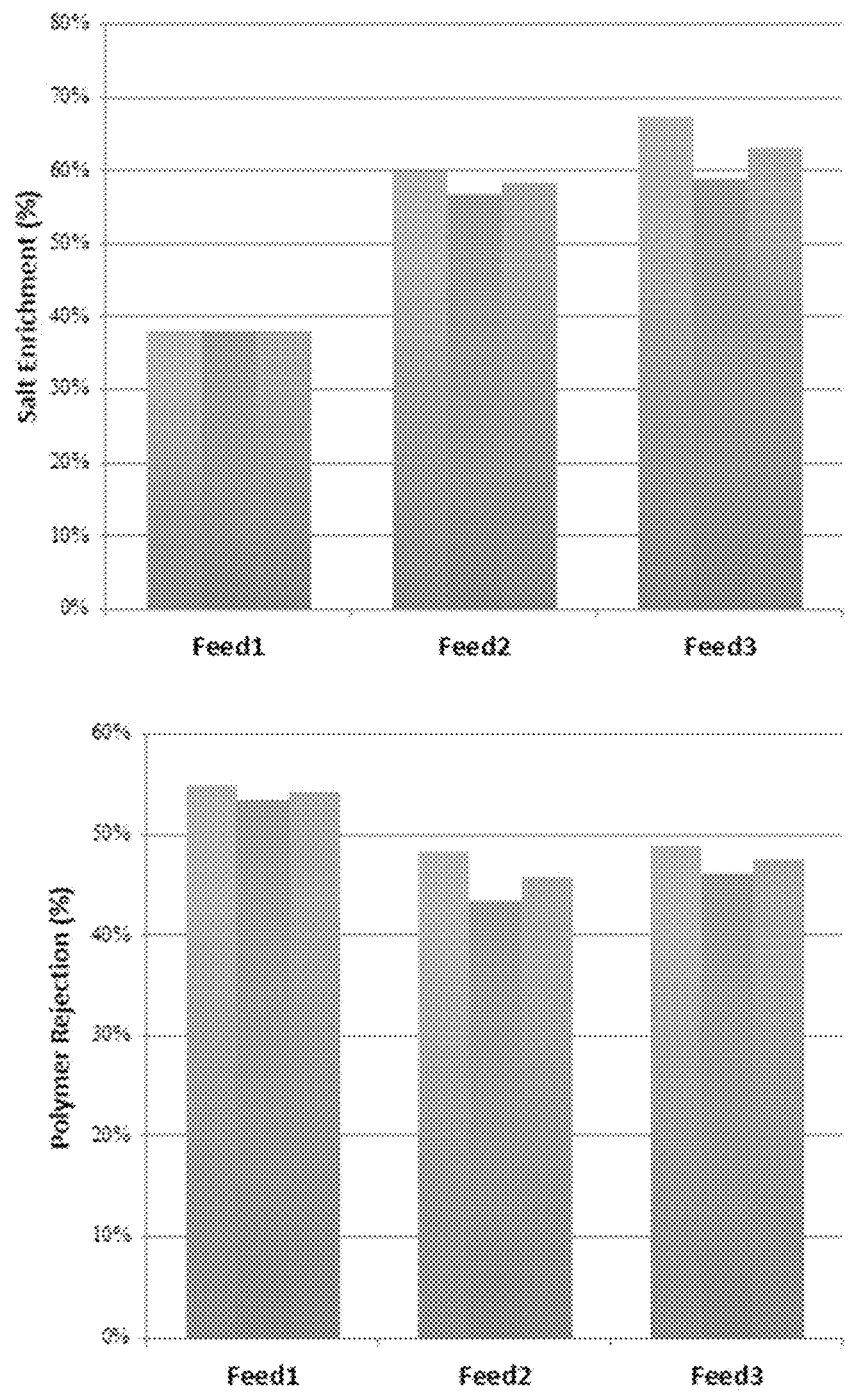
Figure 9C:
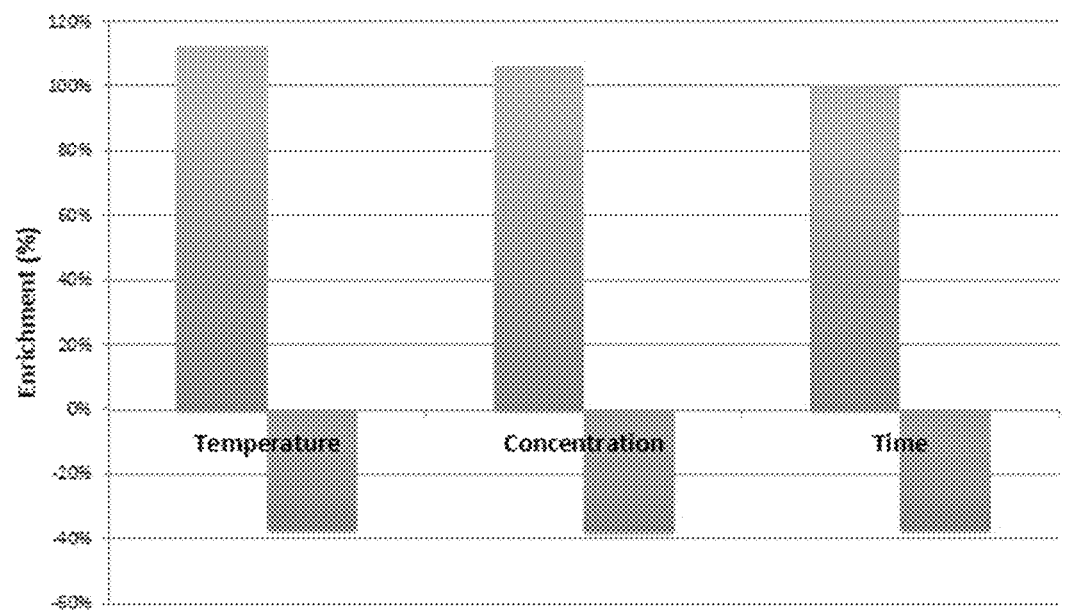
Figure 9D:
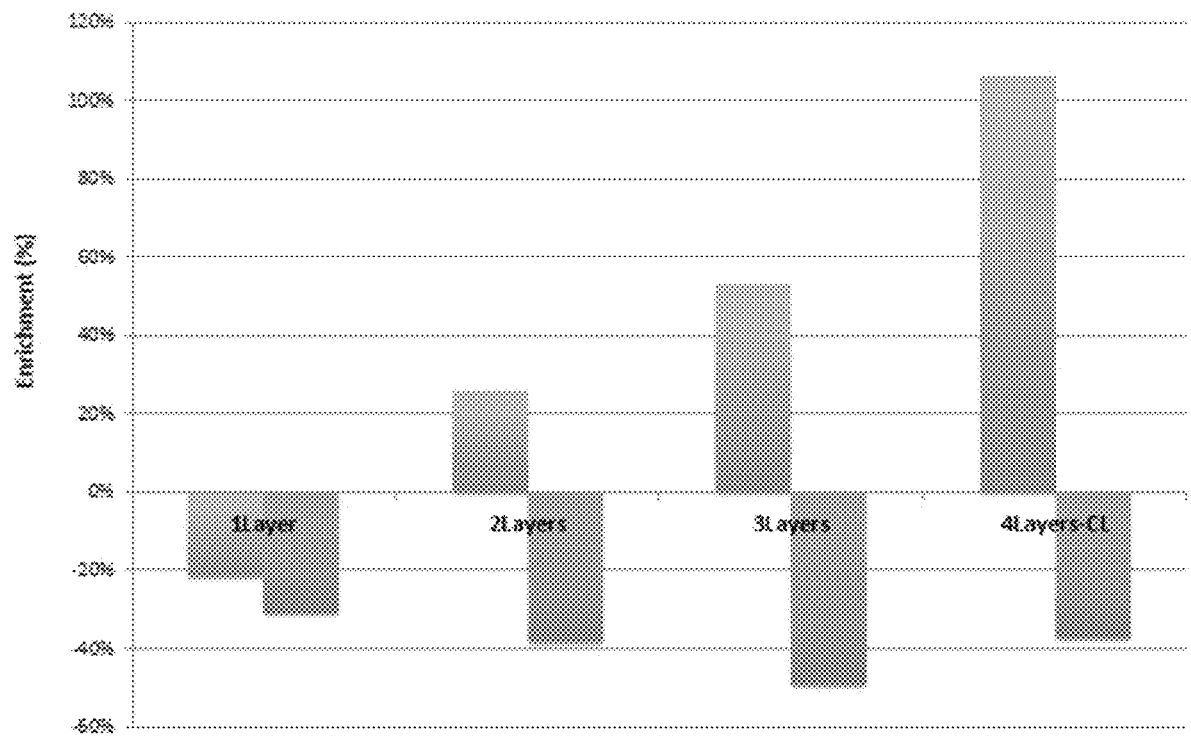
Figure 9E:
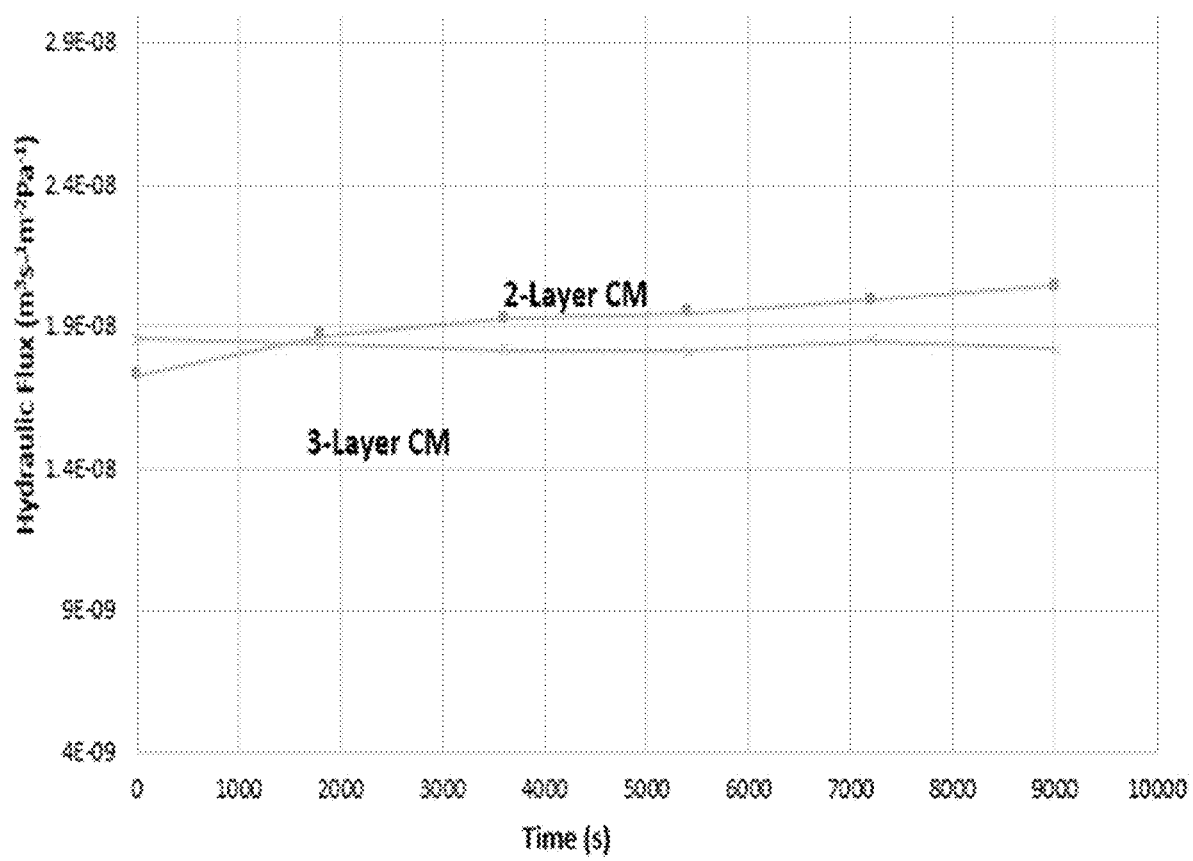

Each of a 2-layer membrane, a 3-layer membrane, and a 4-layer crosslinked membrane were prepared from the two-sided method. FIGS. 9A-9B show the results of salt enrichment and polymer rejection using the 2-layer and 3-layer membranes, respectively, and FIG. 9C shows the enrichment percent from the 4-layer membrane. FIG. 9D shows the effect of formation layers from these membranes. FIG. 9E shows the stability of these membranes as a function of time. Notably, these measurements were taken with monomers present in the permeate solution, which affects the calculated salt enrichment.

As flat sheet membranes have two different surfaces (one having more uniform pores with smaller pore openings and being called the active surface, and the other having larger pore openings and being called the support layer), the polymers that were introduced through the support layer had higher chances of being released from the membrane under hydraulic pressure and convective flow. Therefore, the passage of polymer was an issue with these membranes prepared with a two-sided production method.

The membranes prepared by the two-sided process were not efficient at desalination, as the polymers added from the bottom side of the porous support (with the larger pore openings) resulted in a release of polymers from the membrane structure to the permeate solution, which interfered with the performance of the charge mosaic membrane.

Figure 10A:
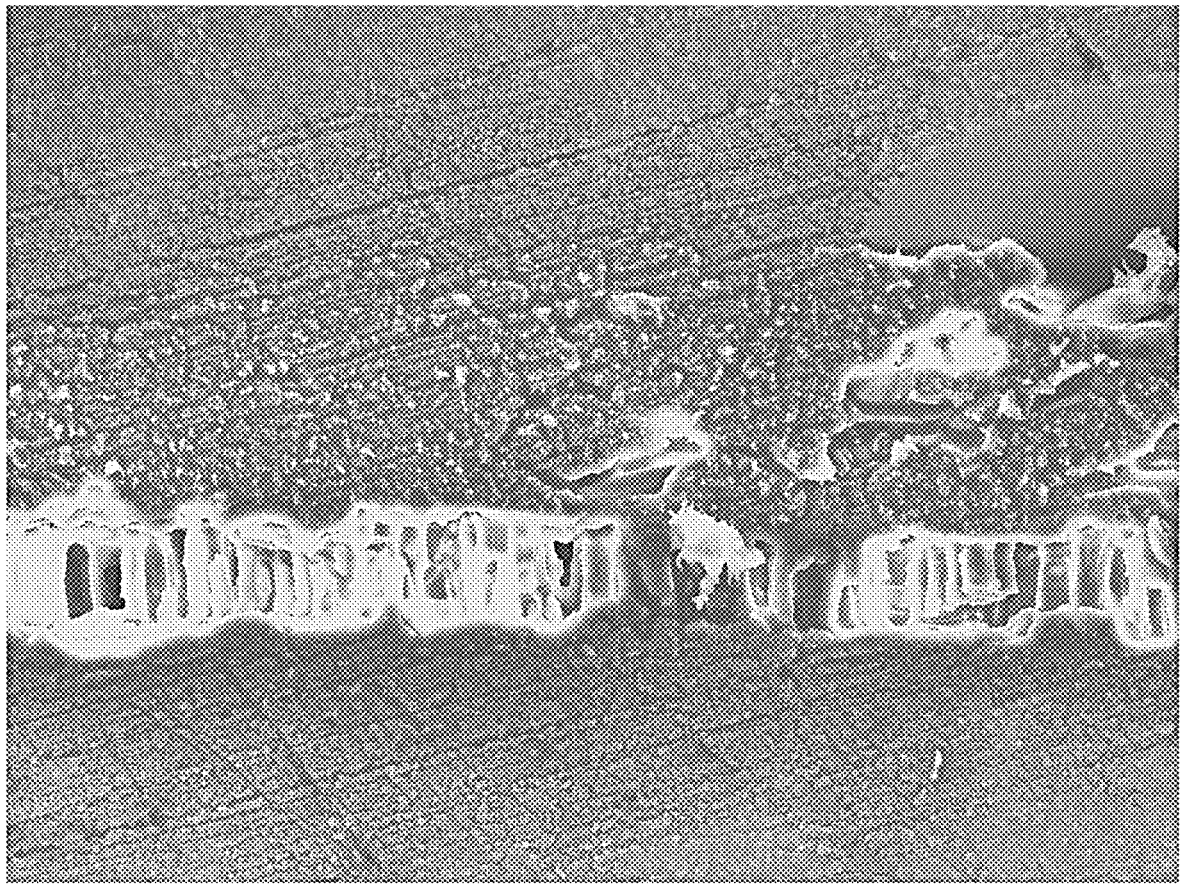
FIGS. 10A-10B: SEM-EDS characterization of a 4-layer membrane prepared from a two-sided method.
Figure 10B:
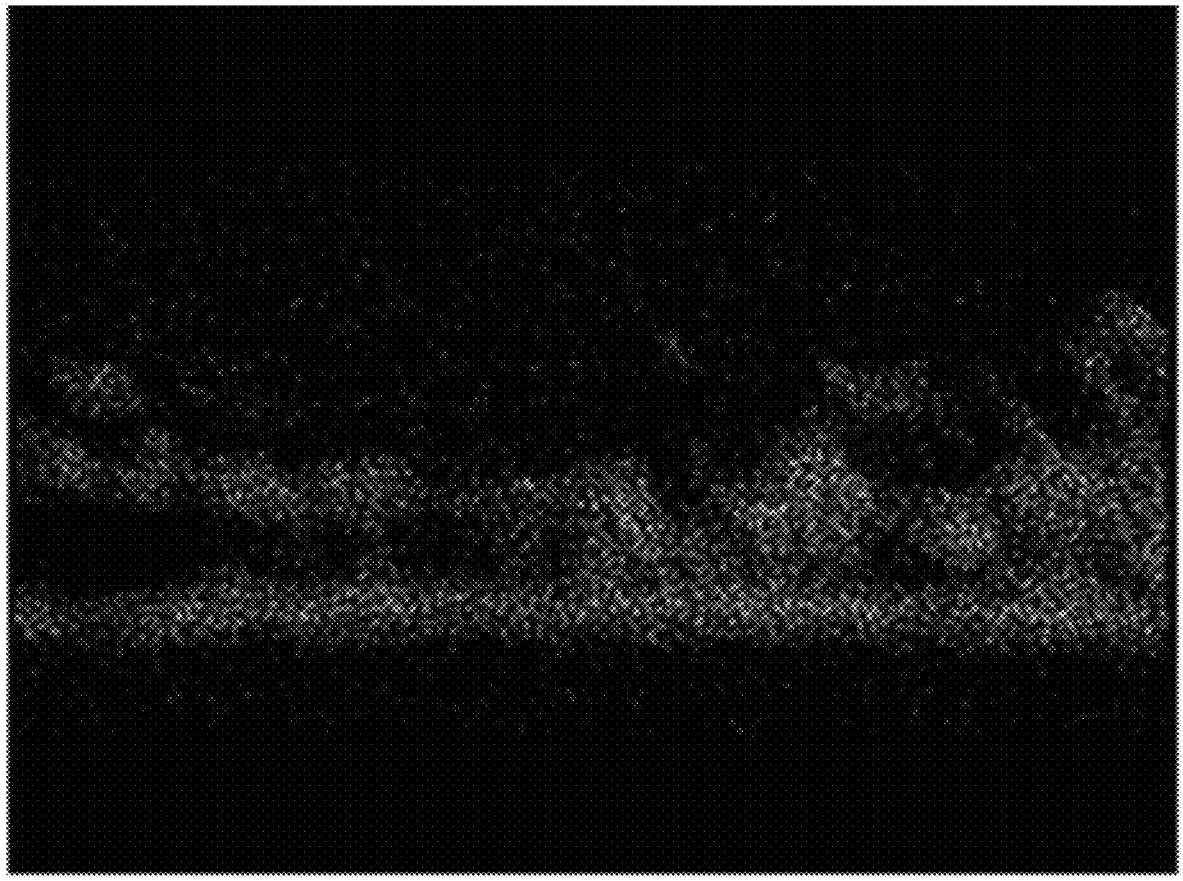
Figure 11A:
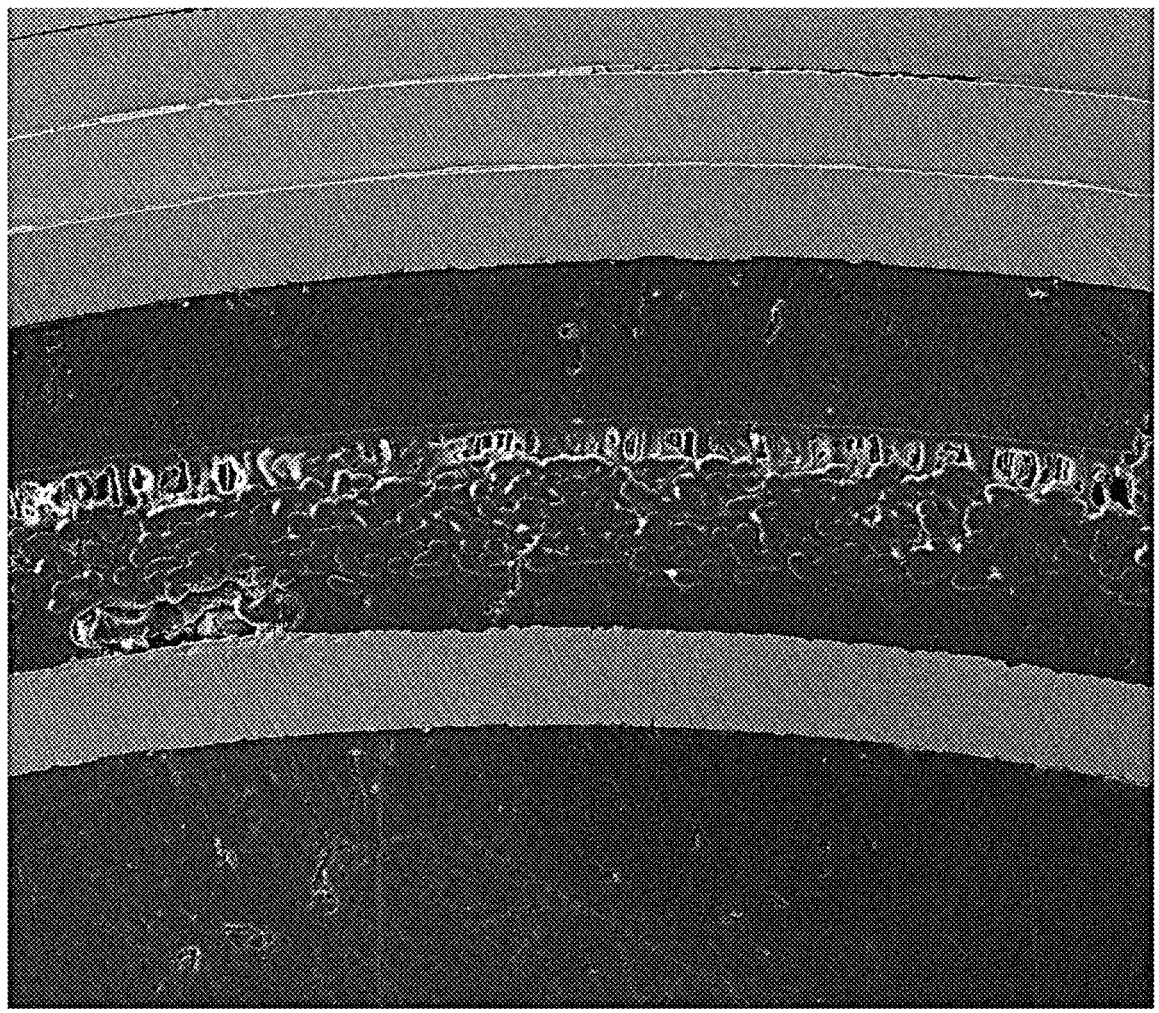
FIGS. 11A-11B: SEM-EDS characterization of a 4-layer membrane prepared from a one-sided method.
Figure 11B:
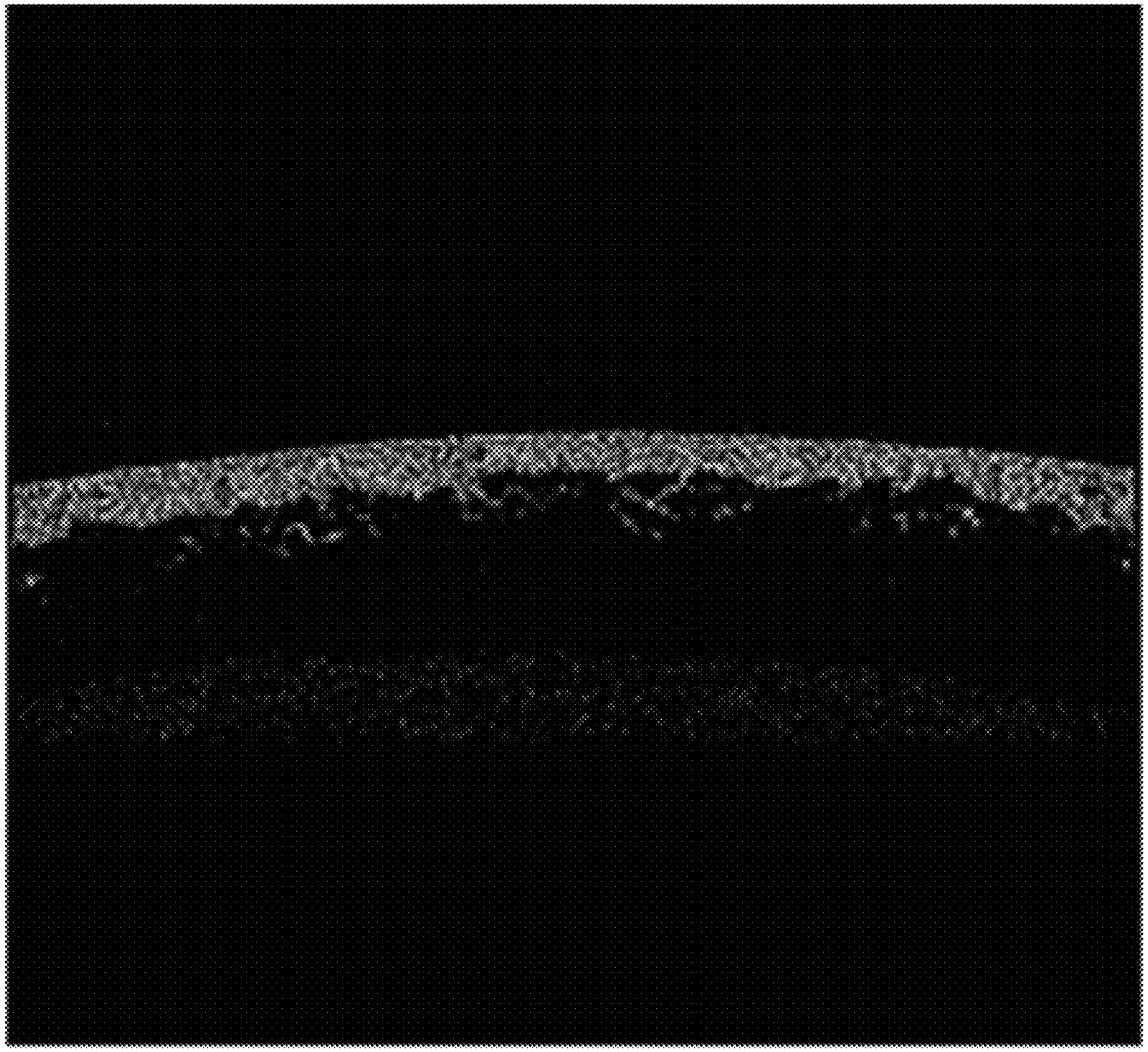

Example III—Comparison Between Membranes made from a One-Sided Method and Membranes Made from a Two-Sided Method FIGS. 10-11 show SEM-EDS characterization of two membranes, one prepared from the two-sided method (see Example II above) and one prepared from the one-sided method (see Example I above). Both of the membranes were 4-layer membranes. FIGS. 10A and 11A show cross-sectional SEM images of the membranes, and FIGS. 10B and 11B show EDS mapping of the membranes. The EDS mapping shown in FIG. 10B shows polymer deposition from opposite sides of the porous support, in contrast to the EDS mapping shown in FIG. 11B. This shows a structural difference between the two membranes. Notably, the membrane from the one-sided method was mounted in epoxy resin, and thus the membrane was held with a metal clip which has an arcuate shape. The membrane from the two-sided membrane was simply cut with scissors. Thus, the image in FIG. 11B has an arcuate curve, but this is merely a function of how the membrane was mounted for the analysis.

As seen in FIG. 11B, the bottom one-third of the membrane and the middle one-third of the membrane are substantially free of the cationic polymer and the anionic polymer, as seen from the lack of green sulfur in the EDS mapping. Instead, there is a substantially uniform layer distributed in the top one-third of the membrane.

The EDS mapping on the SEM images show that the introduction of polymers from different sides of the porous support created the charge mosaic membranes at different positions, which is believed to be the reason why the one-sided method produces membranes that are stable in place and perform successfully with respect to the permeation of salts.

Figure 12A:
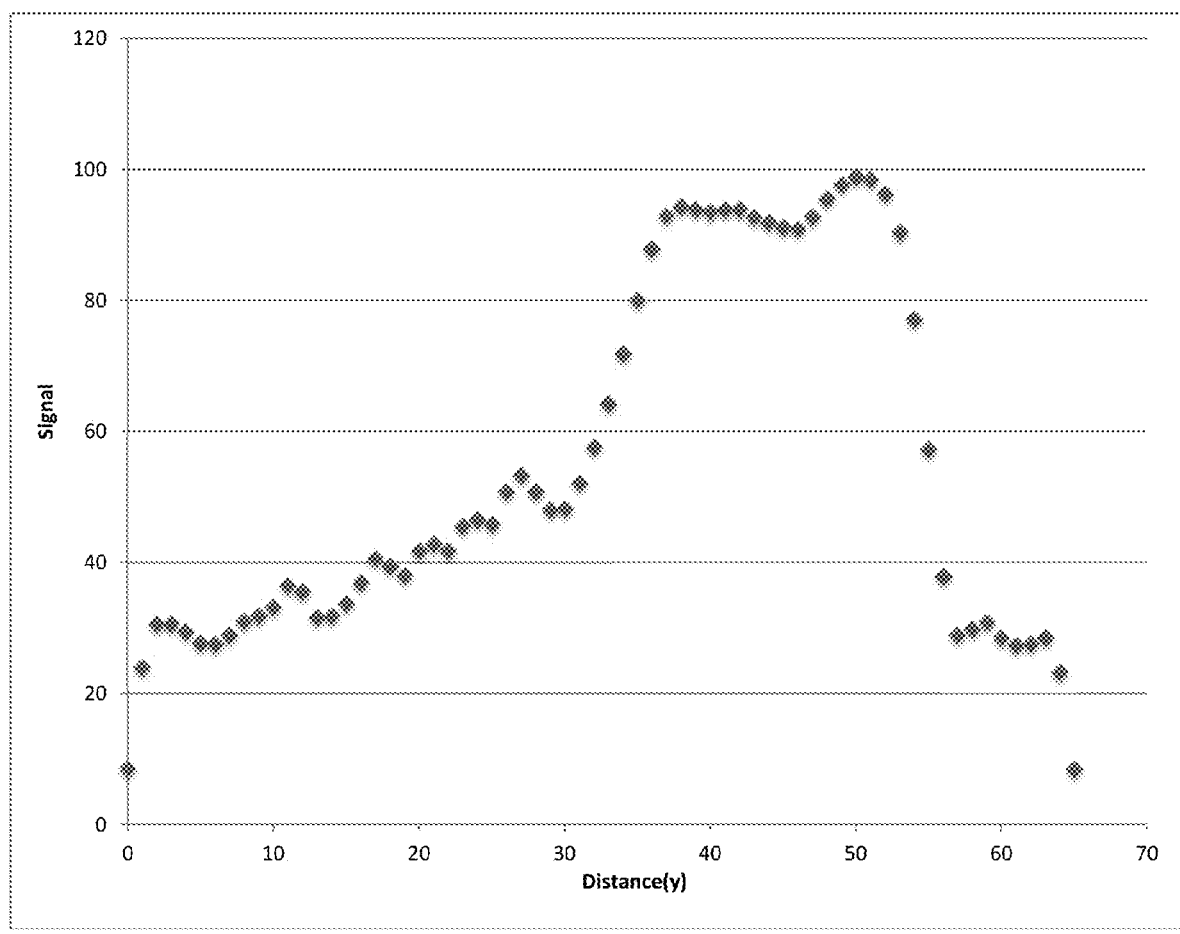
FIGS. 12A-12C: Quantification analysis of EDS mapping of a 4-layer membrane prepared from a two-sided method.
Figure 12B:
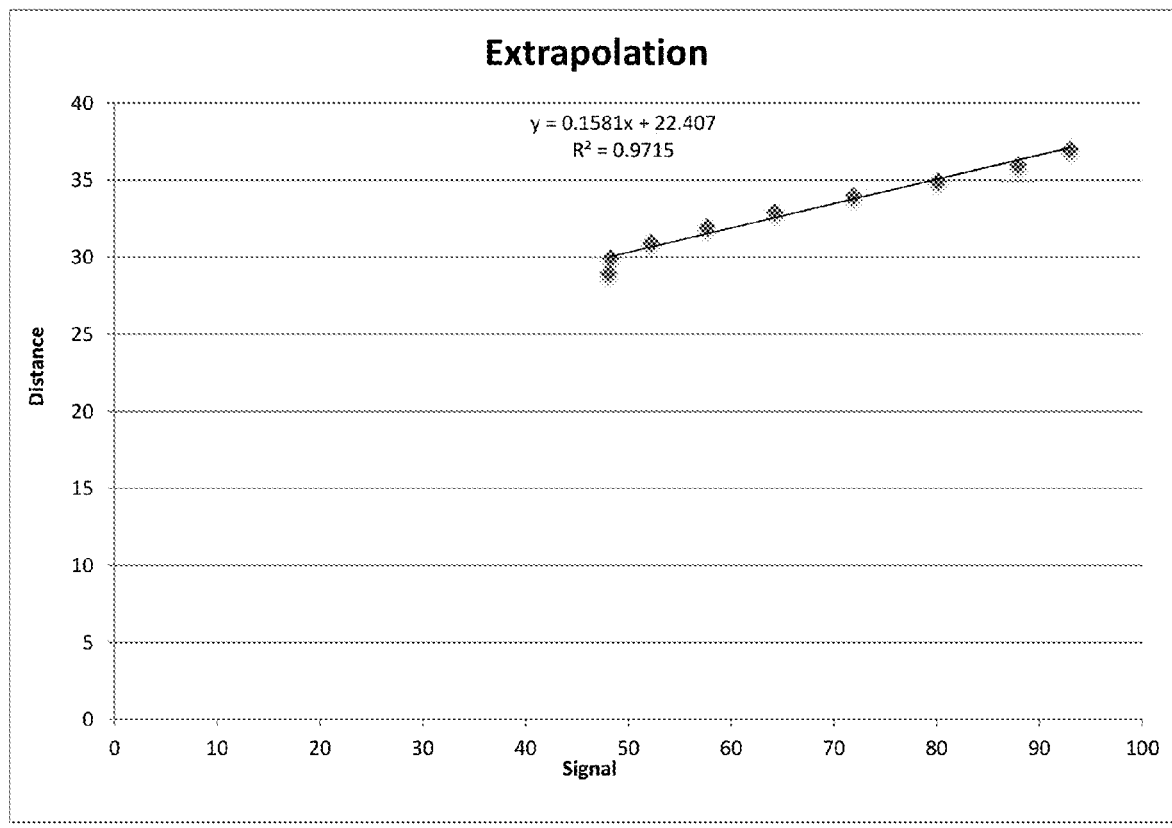
Figure 12C:
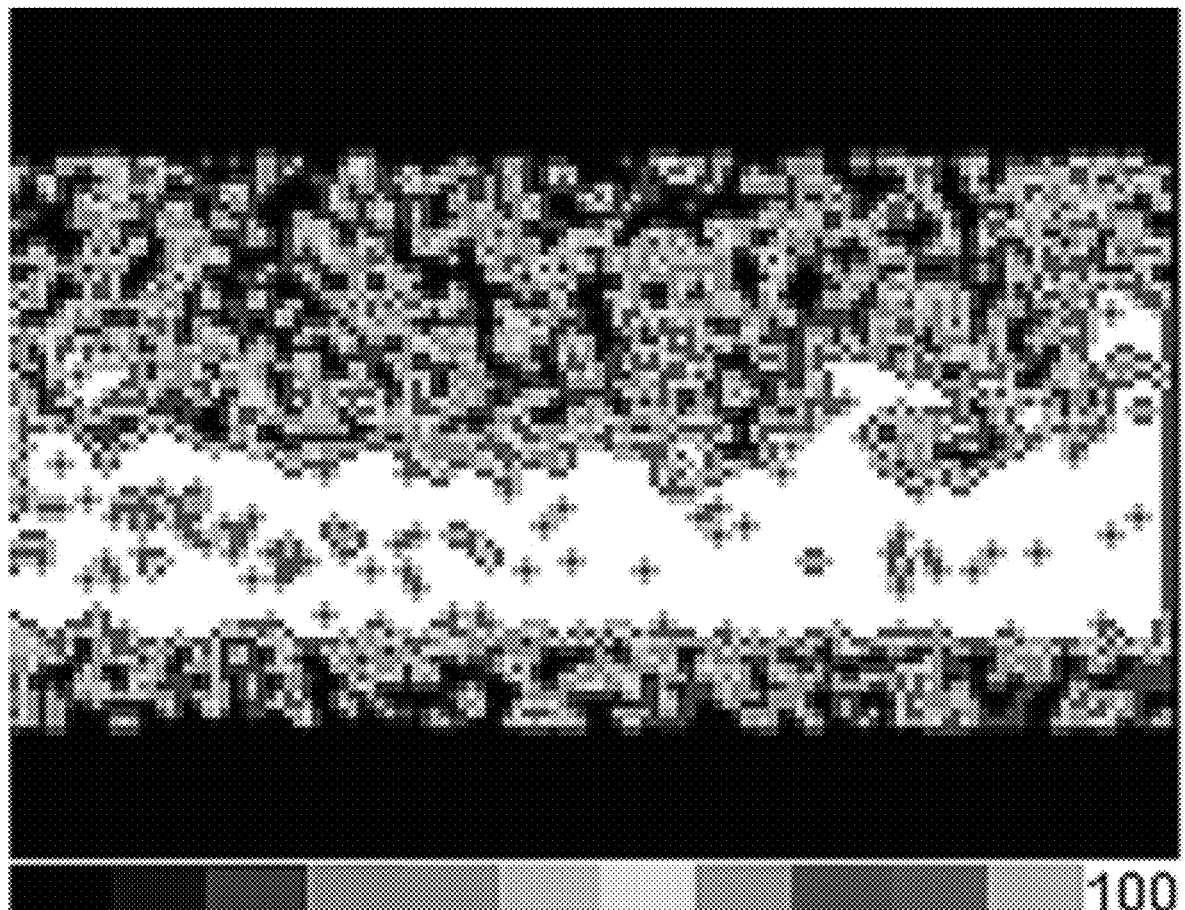
Figure 13A:
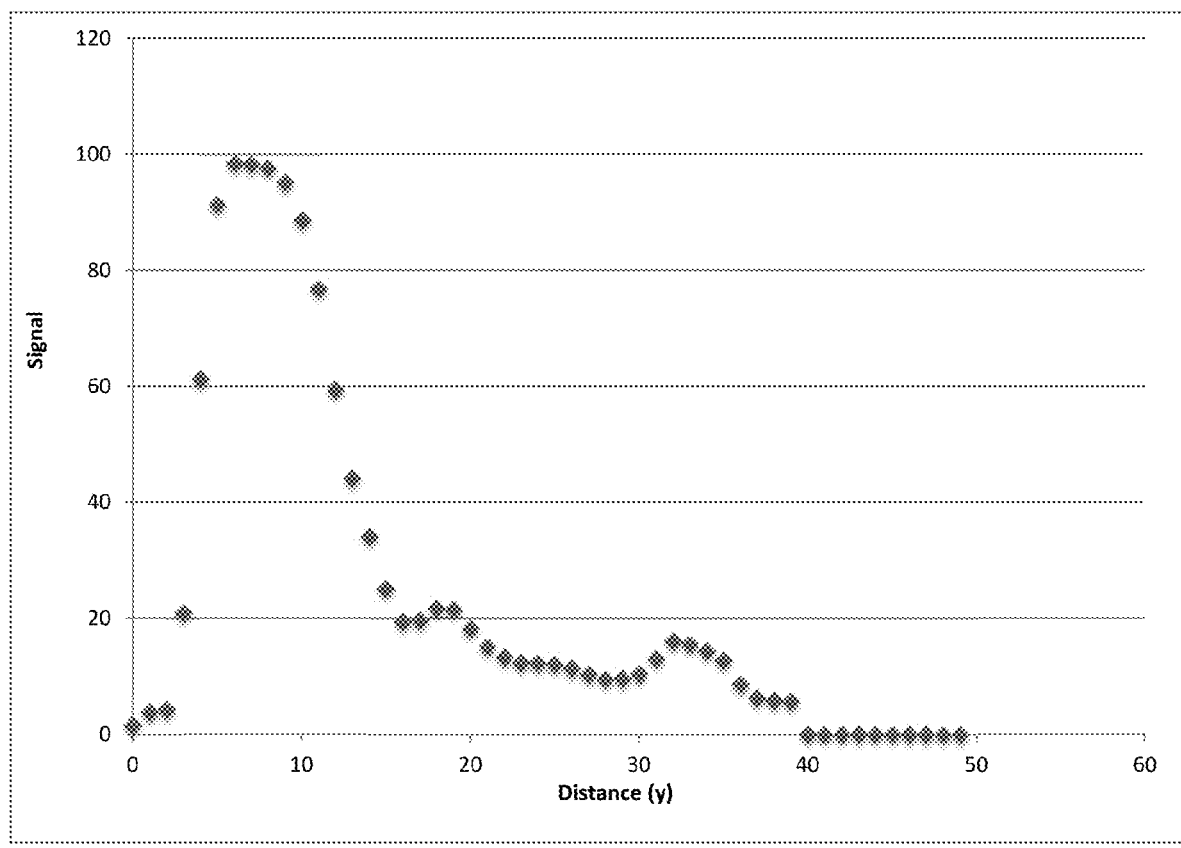
FIGS. 13A-13C: Quantification analysis of EDS mapping of a 4-layer membrane prepared from a one-sided method.
Figure 13B:
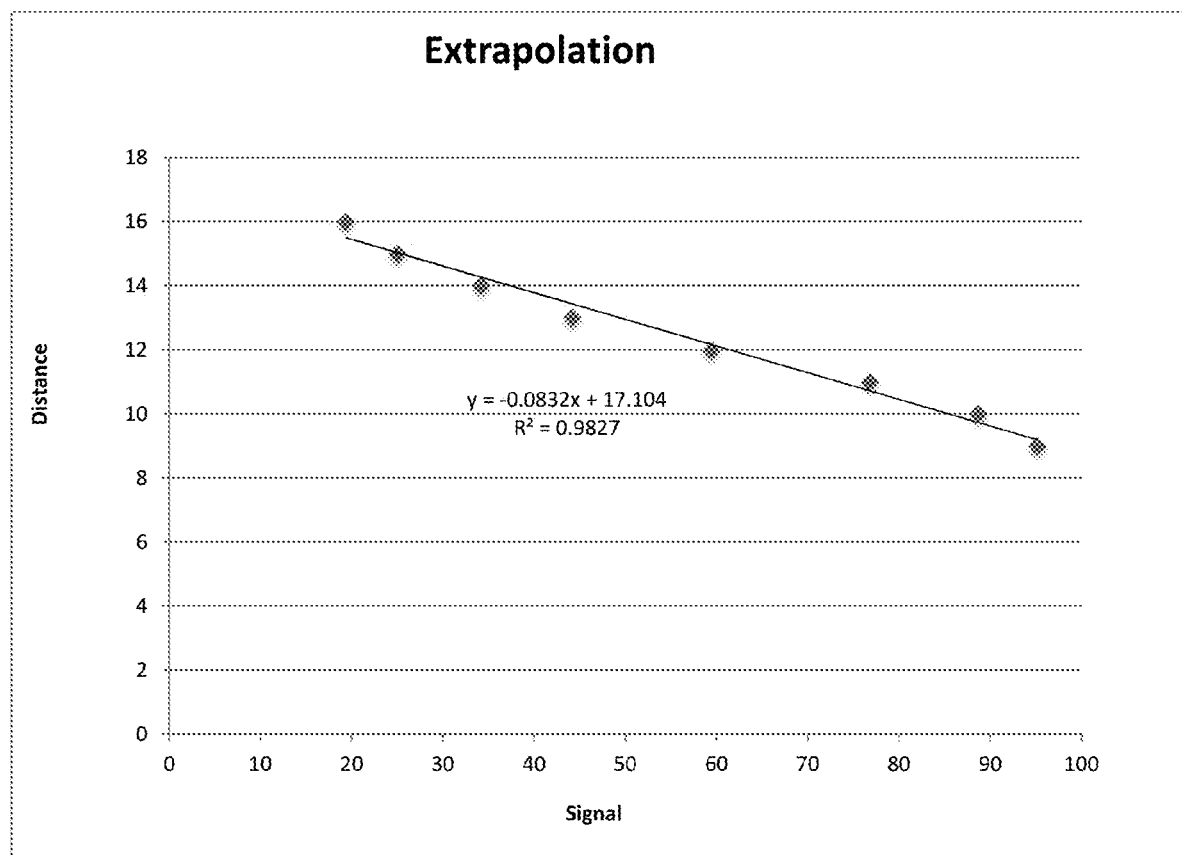
Figure 13C:
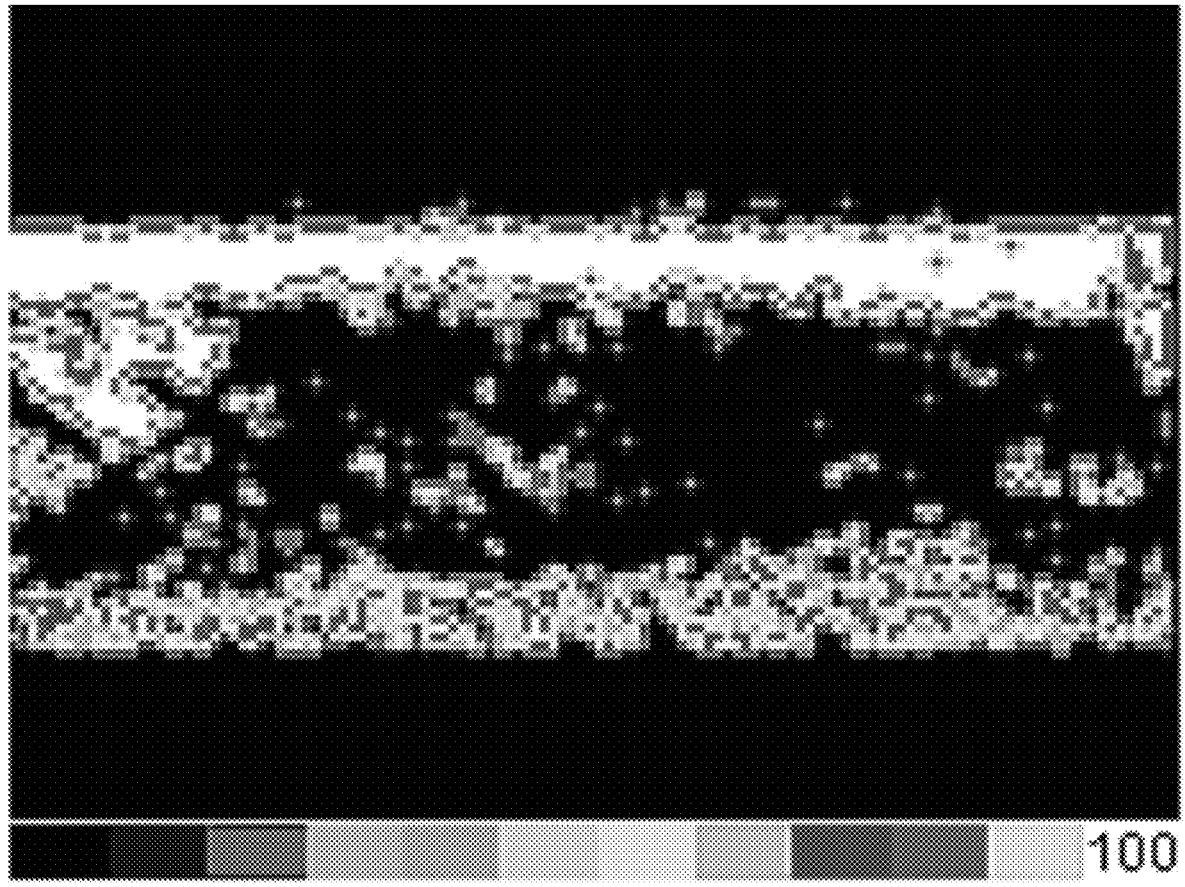

A quantification analysis was conducted on the EDS mapping shown in FIGS. 10B and 11B. The quantification analysis on the membrane produced from the two-sided method is shown in FIGS. 12A-12C, and the quantification analysis on the membrane produced from the one-sided method is shown in FIGS. 13A-13C. The EDS sulfur signal was analyzed over both the x-axis and the y-axis of the membrane samples. Then, the signals were averaged on the x-axis and plotted over distance from the surface of the membrane (y=0) to the bottom of the sample. For each sample, the surface was defined where sulfur signals start to become positive values. The thickness of the dense layer of polymers was decided by extrapolation of high signals over distance, and finding at which y-value the average signal tends to go to zero. The mapping images clearly show how the diffusion of polymers is different from the two methods. However, in both cases, the rough estimation shows that ~80% of polymers are laid close to the surface from which they are introduced to the membrane. Thus, in the membrane produced from the one-sided method, about 80% of the polymers are within the top one-third of the thickness of the membrane (i.e., the third closest to the surface from which the polymers were deposited), but in the membrane produced from the two-sided method, about 80% of the polymer added from the top surface is within the top one-third of the thickness and about 80% of the polymer added from the bottom surface is within the bottom one-third of the thickness.

Certain embodiments of the compositions, devices, and methods disclosed herein are defined in the above examples. It should be understood that these examples, while indicating particular embodiments of the present disclosure, are given by way of illustration only. From the above discussion and these examples, one skilled in the art can ascertain the essential characteristics of this disclosure, and without departing from the spirit and scope thereof, can make various changes and modifications to adapt the compositions, devices, and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A charge mosaic membrane comprising:
   a porous support having a first surface and a second surface with a thickness therebetween, wherein the porous support comprises at least one pore extending from the first surface through the thickness to the second surface;
   wherein the pore defines a top one-third, a middle one-third, and a bottom one-third, wherein the top one-third comprises a third of the thickness extending to the first surface, the bottom one-third comprises a third of the thickness extending to the second surface, and the middle one-third comprises a third of the thickness extending between the top one-third and the bottom one-third; and
   a charge mosaic in the pore comprising an anionic polymer and a cationic polymer;
   wherein the cationic polymer and the anionic polymer form a substantially uniform layer in the top one-third of the pore.

2. The charge mosaic membrane of claim 1, wherein the charge mosaic comprises a base layer of the anionic polymer and the cationic polymer, and further comprises at least one or more of:
   a first layer comprising the anionic polymer deposited on the base layer;
   a second layer comprising the cationic polymer deposited on the first layer;
   a third layer comprising the anionic polymer deposited on the second layer; and,
   a fourth layer comprising the cationic polymer deposited on the third layer.

3. The charge mosaic membrane of claim 1, wherein the porous support comprises polyacrylonitride (PAN).

4. The charge mosaic membrane of claim 1, wherein at least one of the anionic polymer and the cationic polymer is a naturally derived, food grade polymer.

5. The charge mosaic membrane of claim 1, wherein at least one of the anionic polymer and the cationic polymer is substantially free from oligomers and unreacted monomers.

6. The charge mosaic membrane of claim 1, wherein the porous support comprises a plurality of pores extending from the first surface through the thickness to the second surface, and each of the plurality of pores comprises the charge mosaic.

7. The charge mosaic membrane of claim 1, wherein the anionic polymer is selected from the group consisting of polyanionic sodium polystyrene sulfonate (PSS), polyacrylic acid, sodium alginate, and combinations thereof.

8. The charge mosaic membrane of claim 1, wherein the cationic polymer is selected from the group consisting of polycationic polyallylamine hydrochloride (PAH), epilson polylysine, polyethyleoimine, polydiallyldimethylammonium, chitosan, and combinations thereof.

9. A method of permeating salt in an aqueous solution, the method comprising:
   passing an aqueous feed solution containing salt through a charge mosaic membrane of claim 1 to permeate salt.

10. The method of claim 9, further comprising adding a salt push agent to the aqueous feed solution.

11. The method of claim 10, wherein the salt push agent contains either Na or Cl ions.

12. The method of claim 9, wherein the charge mosaic membrane includes multiple layers to minimize defects and increase selectivity.

13. The method of claim 9, further comprising crosslinking the charge mosaic to tighten the charge mosaic and increase selectivity while also increasing stability so as to enhance salt permeation.

14. A charge mosaic membrane comprising:
- a porous support having a first surface and a second surface with a thickness therebetween, wherein the porous support comprises at least one pore extending from the first surface through the thickness to the second surface;
- wherein the pore defines a top one-third, a middle one-third, and a bottom one-third, wherein the top one-third comprises a third of the thickness extending to the first surface, the bottom one-third comprises a third of the thickness extending to the second surface, and the middle one-third comprises a third of the thickness extending between the top one-third and the bottom one-third; and
- a charge mosaic in the pore comprising an anionic polymer and a cationic polymer, wherein at least 80% of the anionic polymer and the cationic polymer are distributed in the top one-third of the pore.

15. A charge mosaic membrane comprising:
- a porous support having a first surface and a second surface with a thickness therebetween, wherein the porous support comprises at least one pore extending from the first surface through the thickness to the second surface;
- wherein the pore defines a top one-third, a middle one-third, and a bottom one-third, wherein the top one-third comprises a third of the thickness extending to the first surface, the bottom one-third comprises a third of the thickness extending to the second surface, and the middle one-third comprises a third of the thickness extending between the top one-third and the bottom one-third; and
- a charge mosaic in the pore comprising an anionic polymer and a cationic polymer;
- wherein the cationic polymer and the anionic polymer are distributed in the top one-third of the pore, and the bottom one-third and the middle one-third of the pore are substantially free of the anionic polymer and the cationic polymer.

16. The charge mosaic membrane of claim 15, wherein the cationic polymer and the anionic polymer are substantially uniformly distributed along a width of the pore in the top one-third of the pore.

\* \* \* \* \*